United States Patent
Pathipati

(10) Patent No.: US 12,344,105 B2
(45) Date of Patent: Jul. 1, 2025

(54) WIRELESS POWER CHARGER FOR VEHICLE

(71) Applicant: Zoox, Inc., Foster City, CA (US)

(72) Inventor: Vamsi Krishna Pathipati, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 898 days.

(21) Appl. No.: 17/491,046

(22) Filed: Sep. 30, 2021

(65) Prior Publication Data

US 2023/0098846 A1     Mar. 30, 2023

(51) Int. Cl.
| | |
|---|---|
| B60L 53/122 | (2019.01) |
| H02J 50/10 | (2016.01) |
| B60L 53/39 | (2019.01) |
| H02J 7/00 | (2006.01) |
| H02J 50/90 | (2016.01) |
| H02M 1/42 | (2007.01) |
| H02M 7/06 | (2006.01) |

(52) U.S. Cl.
CPC .......... B60L 53/122 (2019.02); H02J 50/10 (2016.02); *B60L 53/39* (2019.02); *B60L 2210/30* (2013.01); *H02J 7/0048* (2020.01); *H02J 50/90* (2016.02); *H02M 1/4208* (2013.01); *H02M 7/06* (2013.01)

(58) Field of Classification Search
CPC .................................................. B60L 53/122
USPC ......................................................... 320/108
See application file for complete search history.

(56) References Cited

U.S. PATENT DOCUMENTS

| | | | |
|---|---|---|---|
| 6,700,808 B2 * | 3/2004 | MacDonald | H02M 3/33561 |
| | | | 363/142 |
| 2010/0054001 A1 * | 3/2010 | Dyer | H02M 3/33507 |
| | | | 363/21.17 |
| 2013/0020989 A1 | 1/2013 | Xia | |
| 2013/0293192 A1 * | 11/2013 | Abe | H02J 50/12 |
| | | | 320/108 |
| 2019/0143822 A1 * | 5/2019 | Malek | H02J 7/00 |
| | | | 320/109 |
| 2020/0161901 A1 | 5/2020 | Tombelli | |
| 2021/0188106 A1 | 6/2021 | Asa | |

FOREIGN PATENT DOCUMENTS

WO     WO2014205452 A1     12/2014

OTHER PUBLICATIONS

PCT Search Report and Written Opinion mailed Feb. 3, 2023 for PCT Application No. PCT/US22/45345, 12 pages.

* cited by examiner

*Primary Examiner* — Yalkew Fantu
(74) *Attorney, Agent, or Firm* — Lee & Hayes, P.C.

(57) ABSTRACT

Techniques for converting power received from a power grid at a first voltage and outputting a signal at a second voltage are discussed herein. A power converter with a transformer that has a 22.5 degrees phase shift between current output by corresponding pairs of secondary windings can be utilized to convert power of a first level to power of a second level. The transformer can output power from 30 secondary windings. The power converter can output power with a total harmonic distortion of 5% and an efficiency of 96% or higher. Further, power can be output by a transmission coil and received by a receive coil in a device, such as a vehicle, to wirelessly charge the vehicle.

20 Claims, 8 Drawing Sheets

WIRELESS POWER CHARGER FOR VEHICLE

BACKGROUND

Electrical chargers for supplying power to vehicles can be inefficient. For example, rates at which power is supplied by electrical chargers can be too low to fully satisfy capabilities of the rechargeable batteries due to power lost from inefficiencies. These inefficiencies can be, in part, due to phase differences between voltages and currents of power grid sides of power chargers and may also lead to unsafe conditions (e.g., high heat levels, etc.). In addition, reducing the time necessary for supplying power to recharge electric vehicles may be important for some uses of electric chargers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
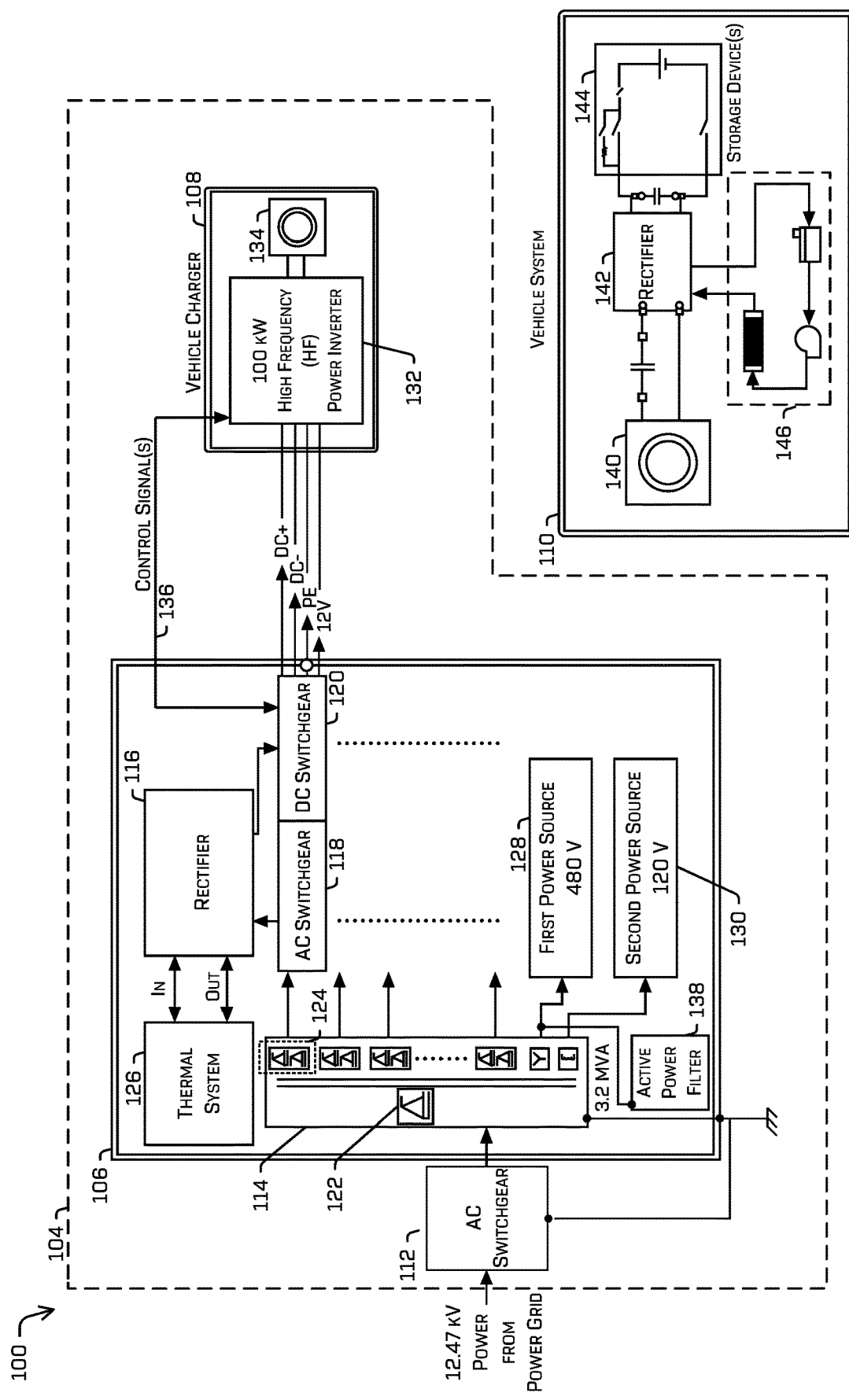
FIG. 1 is an example environment in which a power converter converts power received from a power grid to power for charging one or more storage device(s).

This disclosure describes systems, methods, and apparatuses for supplying electrical power to vehicles. For example, a system for supplying power can include a delta-delta transformer that has a primary winding and a plurality of sets of secondary windings. The transformer can receive alternating current (AC) power from a power grid. The AC power can be received by the transformer via a first AC protection circuit. The transformer can convert the AC power from a first voltage to a second voltage that is less than the first voltage. The transformer can output the AC power at the second voltage, which can be transmitted to a direct current (DC) rectifier component. The AC power at the second voltage can be transmitted to the DC rectifier component, via a second AC protection circuit. The DC rectifier component can convert the AC power at the second voltage to DC power. The DC rectifier component can output the DC power, which can be transmitted to an electrical load (also referred to herein as a "load"). The DC power can be transmitted to the electrical load, via a DC protection circuit.

Attributes of the transformer can enable a power converter that includes the transformer to output power to a vehicle. The vehicle that receives the power can supply the power to one or more energy storage devices (also referred to herein as "storage device(s)") of the vehicle. The transformer can receive power with a voltage at a level of 12.47 kV from a power grid. The plurality of sets of secondary windings can include 30 sets that each output power at a level of 100 kW. A phase shift between individual current pairs associated with corresponding winding pairs in corresponding sets of secondary windings in the transformer can be 22.5 degrees (e.g., a phase shift between a current output from a winding in a pair of windings and another current output from another winding in the pair of windings can be 22.5 degrees). The power converter at full load can have a total harmonic distortion at a level of 5%. Of course, the values discussed herein are examples and may vary based on a particular implementation.

The power converter can include a power inverter that is controlled based on a plurality of modes, such as a bipolar mode and a unipolar mode. The power inverter can be controlled to output power based on a plurality of duty cycles. The modes and the duty cycles for outputting power by the power inverter can be controlled based on a power level of any of one or more of the storage device(s) of the vehicle. For instance, with examples in which the storage device(s) are implemented as a rechargeable battery, the modes and the duty cycles for outputting power by the power inverter can be controlled based on a state of charge (SOC) of the rechargeable battery of the vehicle.

The power inverter can be controlled by a full bridge controller. The full bridge controller can be an H bridge controller that controls the power inverter to output power in the bipolar mode or the unipolar mode. The H bridge controller can control the power inverter to output power at one of the plurality of duty cycles. The H bridge controller can include a plurality of transistors. The plurality of transistors can be switched in different ways to control the transformer to output power in the bipolar mode or the unipolar mode, and in one of the plurality of duty cycles.

The techniques discussed herein can improve a functioning of a power converter in a number of additional ways. The power converter can include chargers that are scalable for a fleet of vehicles to operate as high power chargers. For instance, with examples in which one or more of the vehicle charger(s) in a power charger are configured to transfer power as high power chargers, any of one or more of the high power charger(s) can transfer power to corresponding vehicles at a rate of 100 kilowatts (kW).

Although a charging rate of 100 kW can be utilized by any number (e.g., some or all) of the vehicle charger(s) associated with the power converter, as discussed in this disclosure, it is not limited as such. Any charging rate (e.g., 50 kW, 100 kW, 200 kW, 400 kW, etc.) may be utilized by one or more of the vehicle charger(s).

In some cases, all of the chargers for the power converter can be provided as high power chargers. The chargers can be utilized to charge vehicle storage devices quickly and efficiently. In some cases, all of the vehicle storage devices can be fully charged overnight to enable the vehicles to be operable the next day. The vehicle batteries can be fully charged notwithstanding some or all of the storage devices being completely discharged from prior use during the day. For instance, with examples in which one or more of the vehicle storage devices(s) are fully charged overnight, from a power level (e.g., a SOC) of 0% (within a tolerance level of 10%)-100% (within a tolerance level of 10%), a size of any of one or more of the vehicle storage devices(s) can be 40 kilowatt hours (kWh) or 120 kWh.

Although size of any of one or more of the vehicle storage devices(s) can be 40 kWh or 120 kWh, as discussed in this disclosure, it is not limited as such. Any of one or more of the vehicle storage devices(s) of any size (e.g., 40 kWh, 60 kWh, 80 kWh, 100 kWh, 120 kWh, etc.) may be utilized in corresponding vehicles. Although a tolerance level of 10% for a power level before charging and a tolerance level of 10% for a power level after charging may be utilized for charging the vehicle storage device(s) as discussed in this disclosure, it is not limited as such. Any tolerance level (e.g., 1%, 5%, 15%, etc.) may be utilized for one or more of the power level before charging and the power level after charging.

Furthermore, the power converter according to the current disclosure can provide power to vehicle storage devices more simply and at a lower cost than power converters according to conventional technology. The disclosed power converters can omit a number of stages that would otherwise be required. In some cases, a medium voltage transformer and a high frequency rectifier can be utilized to provide power by the power converter, without low voltage stages for power factor correction (PFC). The power converter does not require stages that include components, such as a low voltage transformer, a rectifier and PFC circuit, a high frequency inverter, and a high frequency transformer, between the medium voltage transformer and the high frequency rectifier. Currents output by the pair of windings in each set of windings in the medium voltage transformer can be 22.5 degrees electrically apart (e.g., the phase shift between currents output by the pair of windings in each set of windings can be 22.5 degrees) for achieving PFC. The power converter does not require a PFC circuitry stage between the medium voltage transformer and the load.

Furthermore, the power converter according to the current disclosure can provide power more safely, efficiently, and reliably than power converters according to conventional technology. In some cases, the power converter can provide power and achieve PFC while maintaining a total harmonic distortion (e.g., a level of harmonic distortion associated with an input of a charging circuit that includes the transformer and the rectifier) of 5% or less. Power can be provided by the power converter operating at least at 93% efficiency. In some cases, the power converter can operate at an efficiency level of 95% or higher (e.g., 95%, 96%, 96.5%, etc.). The efficiency of the power converter can be significantly higher than for power converters according to conventional technology, which generally operate at an efficiency of 91% or less. The higher level of efficiency of the power converter can be achieved due to the PFC capabilities of the medium voltage transformer enabling omission of the low voltage stages. By providing the power converter with windings in each of the sets of windings that are 22.5 degrees electrically apart, to thereby achieve a high level of efficiency, the power converter can transfer a high level of power to any or all of the chargers for the vehicle storage devices. In some cases, each of the chargers of the power converter can provide 100 kilowatts (kW) of power to the corresponding vehicle storage device(s). The power converter can include at least 30 chargers with transmission coils that are utilized to wirelessly transmit, by individual ones of the plurality of transmission coils and to corresponding receive coils of the corresponding vehicles, 100 kW of power.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configure to wirelessly transfer power.

FIG. 1 is an example environment 100 in which a power converter converts power received from a power grid to power for charging one or more storage device(s). The environment 100 can include an electric power charger 104 for providing power, via one or more vehicle chargers, to one or more vehicle power systems. In some examples, the electric power charger 104 can include a power converter components group 106 (also referred to herein as a "charging circuit") to provide power, via a vehicle charger 108 of the vehicle charger(s), to a vehicle system 110 of the vehicle system(s). The electric power charger 104 can include alternating current (AC) switchgear (also referred to here as "medium voltage switchgear") (also referred to herein as an "AC protection circuit") 112 for receiving power from the power grid. The power converter components group 106 can convert power that is received from the power grid and by the electric power charger 104, via the AC switchgear 112.

The AC switchgear 112 can receive, as power that is provided by the power grid, an AC signal (also referred to herein as an "electrical signal" or "electrical power") at a voltage level (e.g., a "medium voltage level") (e.g., 12.47 kilovolts (kV)). In some examples, the AC switchgear 112 can include one or more components (also referred to herein as "equipment") through which power is transferred to the power converter components group 106. Any of the component(s) of the AC switchgear 112 can be a protection component, such as a fuse, a circuit breaker, a switch, and the like. The AC switchgear 112 can be utilized to protect, control, and/or isolate any components (e.g., one or more components of the power converter components group 106) of the electric power charger 104. In some examples, the AC switchgear 112 can include one or more protection components (e.g., one or more of fuses, one or more circuit breakers, and/or one or more switches, etc.) electrically connected between a wire (also referred to herein as a "conductor") connected to the power grid and to the primary winding 122, for individual wires of a plurality of wires connected between the power grid and the primary winding 122.

Although a level of voltage (e.g., a "medium voltage") associated with input power from a grid, or with any of one or more of the components (e.g., "medium voltage components") of the power converter, can be 12.47 kV, as discussed in this disclosure, it is not limited as such. Any voltage level (e.g., 1 kV, 4.16 kV, 12.47 kV, 13.2 kV, 35 kV, etc.) may be utilized for the voltage (e.g., the "medium voltage").

The power converter components group 106 can include a transformer 114, one or more rectifier components, one or more AC switchgear components, and one or more DC switchgear components. By way of example, the power converter components group 106 can include a rectifier component 116, an AC switchgear component (also referred to herein as "AC switchgear" or an "AC protection circuit")) 118, and a DC switchgear component (also referred to herein as "DC switchgear" or a "DC protection circuit") 120. The transformer 114 can include a primary winding 122, and one or more sets of secondary windings. By way of example, the transformer 114 can include a set of secondary windings (also referred to herein as a "secondary winding set") 124.

Power can be transferred by the power grid, through the AC switchgear 112, and received by the primary winding 122. The power grid can transmit power to the AC switchgear 112, via one or more wires. The AC switchgear 112 can transfer, to the transformer 114, power that is received from the power grid, via one or more wires. The transformer 114 can be utilized to convert power that is transferred by the primary winding 122 and to individual ones (e.g., the set of secondary windings 124) of the plurality of sets of secondary windings. A characteristic of the transformer can include electric separation between the primary winding 122 and the set(s) of secondary windings. The electric separation can be implemented as a core between the primary winding 122 and individual ones (e.g., the set of secondary windings 124) of the set(s) of secondary windings.

In some examples, the primary winding 122 can be a delta winding. However, this disclosure is not limited as such. The primary winding 122 can be any type of winding (e.g., delta winding or a Y winding).

A phase difference between currents output by windings in individual ones (e.g., the set of secondary windings 124) of the set(s) of secondary windings can be less than or equal to 22.5 degrees. In some examples, a phase difference between currents output by a pair of windings in each of the secondary winding set(s) can be less than or equal to 22.5 degrees. By way of example, a phase shift between a first current output by a first winding in a pair of windings (e.g., the set of secondary windings 124 that outputs the AC power at the second voltage) and a second current output by a second winding in the set of secondary windings 124 can be less than or equal to 27.5 degrees. In those examples, the phase shift can be less than or equal to 27.5 degrees. However, the current disclosure is not limited as such, currents output by any corresponding pair of windings in any set of the set(s) of secondary windings can have any phase difference (e.g., 1, 5, 10, 15, 22.5, 25, 27, 27.4, 27.5, 27.6, 28, 29, 30, etc.).

In some examples, individual ones (e.g., secondary windings) in corresponding sets (e.g., the set of secondary windings 124) of the set(s) of secondary windings can be delta windings. However, this disclosure is not limited as such. Any individual ones (e.g., secondary windings) in any sets (e.g., the set of secondary windings 124) of the set(s) of secondary windings can be any type of winding (e.g., any set of secondary windings can include a delta-delta winding pair, a delta-Y winding pair, a Y-delta winding pair, or a Y-Y winding pair).

The transformer 114 can convert power (e.g., "medium voltage power") of a first power type (e.g., AC power at a first voltage level (e.g., 12.47 kilovolts (kV))) to power (e.g., "low voltage power") of a second power type (e.g., AC power at a second voltage level (e.g., 360 volts (V)±10% V). Individual ones (e.g., the set of secondary windings 124) of the set(s) of secondary windings can output power of the second power type. In some examples, each of the set(s) of secondary windings can output power of the second power type.

Although a level of a voltage (e.g., a "low voltage") associated with any of one or more of the components (e.g., "low voltage component(s)") of the power converter, can be 360 volts (V)±a tolerance level of 10% V, as discussed in this disclosure, it is not limited as such. Any voltage level (e.g., 180 V±a tolerance level of 10% V, 720±a tolerance level of 10% V, etc.) may be utilized for any of the component(s). Although a tolerance level of 10% for a voltage level (e.g., a level of the "low voltage") may be utilized as discussed in this disclosure, it is not limited as such. Any tolerance level (e.g., 1%, 5%, 15%, etc.) may be utilized for any level of the voltage level(s) (e.g., the "low voltage level(s)).

In some examples, a number of sets of secondary windings in the plurality of sets of secondary windings can be 30. However, the current disclosure is not limited as such, the plurality of sets of secondary winding can include any number (e.g., 10, 20, 30, 40, etc.) of sets of secondary windings.

The transformer 114 can provide power (e.g., "low voltage power") from the set(s) of secondary windings and to rectifier component(s). In some examples, the transformer 114 can provide power at a power at a level (e.g., 3.2 million volt-amps (MVa)) utilized by six groups of five vehicle chargers. Power that is provided by individual ones (e.g., the set of secondary windings 124) of the set(s) of secondary windings can be transferred to the corresponding rectifier component(s) (e.g., a rectifier component (also referred to herein as a "rectifier") 116), via the corresponding AC switchgear component(s) (e.g., the AC switchgear 118). By way of example, the rectifier 116 can convert power of the second power type (e.g., AC power at a second voltage level (e.g., 360 volts (V)±10% V)) to power of a third power type (e.g., 100 kW DC power at a third voltage level (e.g., 240 V-410 V)). The rectifier 116 can receive, from individual secondary winding set(s) (e.g., the set of secondary windings 124) in the transformer 114, power, which is converted by the rectifier 116 and provided to the corresponding vehicle charger (e.g., the vehicle charger 108) of the vehicle charger(s). In some examples, individual ones (e.g., the rectifier 116) of the rectifiers can be corresponding diode bridge rectifiers. However, the current disclosure is not limited as such and any of one or more of the rectifier(s) can be any type of rectifier (e.g., a 6-pulse diode bridge rectifier, a 12-pulse diode bridge rectifier, an 18-pulse diode bridge rectifier, etc.) for converting AC power to DC power, such as a half-wave rectifier, a full-wave rectifier, an uncontrolled rectifier, a controlled rectifier, etc.

Individual ones (e.g., the rectifier 116) of the rectifier(s) can receive power from the corresponding set(s) of secondary windings (e.g., the set of secondary windings 124) in the transformer 114. Power that is received from the transformer 114 can be converted by individual ones (e.g., the rectifier 116) of the rectifier(s). In some examples, the rectifier 116 can be directly coupled to the transformer 114 (e.g., without any components in series between the rectifier 116 and the transformer 114).

In some examples, individual ones (e.g., the AC switchgear 118) of the AC switchgear component(s) can be implemented in a similar way as for the AC switchgear 112. In those examples, individual AC switchgear components can include one or more protection components (e.g., one or more of fuses, one or more circuit breakers, and/or one or more switches, etc.) electrically connected between a wire connected to the corresponding secondary winding of the corresponding set of secondary windings (e.g., the corresponding winding of the set of secondary windings 124) and a wire connected to the corresponding rectifier in the corresponding rectifier (e.g., the rectifier 116), for individual ones of one or more wires connected to the transformer 114 (e.g., wire(s) connected between the transformer 114 and the AC switchgear 118) and the rectifier(s) (e.g., corresponding wire(s) connected between the AC switchgear 118 and the rectifier 116).

The power converter components group 106 can include one or more thermal systems, one or more thermal system power sources, and one or more housekeeping power sources. By way of example, the power converter components group 106 can include a thermal system 126, a first power source 128, and a second power source 130. In some examples, the first power source 128 can be utilized as a thermal system power source. In some examples, the second power source 130 can be utilized as a housekeeping power source.

In some examples, the thermal system 126 can include fans and/or other cooling equipment to maintain a temperature of a cabinet that includes the power converter components group 106 at or below a threshold temperature. In those examples or other examples, the thermal system 126 can include warming equipment (e.g., one or more heaters, one or more thermal insulators) to maintain a temperature of a cabinet that includes the power converter components group 106 at or above a threshold temperature (e.g., the warming equipment can be utilized to prevent any components of the power converter components group 106 from freezing). The thermal system 126 can maintain a temperature of any of one or more components of the power converter components group 106.

In some examples, the first power source 128 can be a secondary winding (e.g., a Y winding). In those examples, power can be transferred from the primary winding 122 to the first power source 128 and/or the second power source 130 in a similar way as discussed above for power transferred from the primary winding 122 to the set of second windings 124. Power of the first power type can be transmitted by the primary coil and converted by the transformer 114 (e.g., the primary winding 122 and the first power source 128) to power of a type (e.g., AC power at 480 V). Power of the first power type can be transmitted by the primary coil and converted by the transformer 114 (e.g., the primary winding 122 and the second power source 130) to power of a type (e.g., AC power at 120 V).

Although a first power source (e.g., the first power source 128) can be a Y winding as discussed above in this disclosure, it is not limited as such. Any type of winding (e.g., a delta winding, a single winding, etc.) may be utilized for the first power source.

In some examples, the second power source 130 can include a single winding. The second power source 130 can be utilized to provide power to one or more components (e.g., power outlet(s)) of the power converter components group 106, or one or more other external components (e.g., power outlet(s)). In some examples, second power source 130 can include one or more batteries, one or more capacitors, and/or one or more other energy storage components (e.g., one or more storage components to maintain power when a main power (e.g., power from the power grid) is off).

Although a second power source (e.g., the second power source 130) can be a single winding as discussed above in this disclosure, it is not limited as such. Any type of winding (e.g., a delta winding, a Y winding, etc.) may be utilized for the first power source.

Individual rectifier(s) (e.g., the rectifier 116) can convert and provide power (e.g., DC power) to corresponding vehicle charger(s) (e.g., the vehicle charger 108), via corresponding DC switchgear component(s) (e.g., the DC switchgear 120). In some examples, each of the rectifier(s) can convert and provide power that is received from the transformer 114 to the corresponding vehicle charger(s), via the corresponding DC switchgear component(s).

Individual ones (e.g., the vehicle charger 108) of the vehicle charger(s) can include corresponding inverters of one or more inverters, and corresponding transmission coils of one or more transmission coils. By way of example, the vehicle charger 108 can include an inverter (also referred to herein as a "power inverter) 132, and a transmission coil 134. Power transferred by individual ones (e.g., the rectifier component 116) of the rectifier component(s) of the power converter components group 106, via the corresponding DC switchgear component(s) (e.g., the switchgear component 120) can be received by the corresponding inverter(s) (e.g., the inverter 132). Individual ones (e.g., the inverter 132) of the inverter(s) can receive power from the corresponding DC switchgears via a positive DC wire (e.g., a DC+ conductor), a negative DC wire (e.g., a DC− conductor), a protective earth (PE) wire (e.g., a ground conductor), and another DC wire (e.g., a "12 V" conductor). Individual ones (e.g., the inverter 132) of the inverter(s) can convert power of the third power type (e.g., 100 kW DC power at the third voltage level (e.g., 240 V-410 V DC)) received from the corresponding DC switchgear components (e.g., the DC switchgear component 120). Individual inverter(s) (e.g., the inverter 132) can convert power of the third power type to power of a fourth power type (e.g., 100 kW AC power at the third voltage level (e.g., 240 V-410 V)). In some examples, each of the inverter(s) can convert power of the third power type to power of the fourth power type.

One or more wires (e.g., control wire(s)) can be coupled between the power converter components group 106 and the vehicle charger 108. In some examples, the control wire(s) can be coupled between individual ones (e.g., the DC switchgear 120) of the DC switchgear components and the corresponding inverters (e.g., the inverter 132). By way of example, the control wire(s) can be utilized to communicate one or more control signals 136 between the DC switchgear 120 and the inverter 132. Any of one or more control signals of the control signal(s) 136 received by the inverter 132 can be utilized by the inverter 132, to control power output to the transmission coil 134.

The inverter 132 can transmit one or more control signals (e.g., any of one or more control signals of the control signal(s) 136 output by the inverter 132) to the DC switchgear 120, which can be utilized by the DC switchgear 120 to control power transmitted to the inverter 132. In some examples, the control signal(s) 136 can be associated with housekeeping utilized in an occurrence of one or more faults associated with the inverter 132. The control signal(s) 136 can include, in the occurrence of the fault(s), one or more control signals transmitted by the inverter 132 to the power converter components group 106 (e.g., a cabinet including the power converter components group 106). The power converter components group 106 can control a corresponding circuit breaker (e.g., a corresponding circuit breaker in the power converter components group 106), which is associated with one or more circuits in the inverter 132 in which the fault occurs, to be turned off.

In some examples, the control signal(s) 136 transmitted by the inverter 132 to the DC switchgear 120 can include one or more control signals associated with one or more faults (e.g., one or more soft shorts) that can include in the vehicle charger 108. The inverter 132 can measure one or more electrical characteristics of circuits associated with power transfer by the inverter 132 to sense the soft shorts. The electrical characteristic(s) can include one or more measurements of temperature by corresponding temperature sensor(s), one or more measurements of current by one or more current sensors, and/or one or more measurements of voltage by one or more corresponding voltage sensors. The electrical characteristic(s) can be analyzed by the electric power charger 104 to determine patterns associated with any of one or more of the electrical characteristic(s). The patterns can be utilized to determine the soft faults.

The inverter 132 can control power output based on any of one or more input control signal(s) (e.g., any of the control signal(s) 136 transmitted by the DC switchgear 120, and/or any of the control signal(s) input from the vehicle system 110). In some examples, parameters associated with power output by the DC switchgear 120 can be determined based on electrical characteristics measured utilizing one or more sensors (e.g., one or more current sensors and/or one or more voltage sensors) of the DC switchgear 120. The control signals(s) 136 can include one or more control signals that are transmitted by the DC switchgear 120 and that include the parameter(s).

In some examples, individual ones (e.g., the DC switchgear 120) of the DC switchgear component(s) can be implemented in a similar way as for the AC switchgear 112. In those examples, individual DC switchgear components can include one or more protection components ((e.g., one or more of fuses, one or more circuit breakers, and/or one or more switches, etc.) electrically connected between a wire connected to the corresponding rectifier component (e.g., the rectifier 116) and a wire connected to the corresponding vehicle chargers (e.g., the vehicle charger 108), for individual ones of one or more wires connected to the corresponding rectifier(s) (e.g., wire(s) connected between the rectifier 116 and the DC switchgear 120) and the vehicle charger(s) (e.g., corresponding wire(s) connected between the DC switchgear 120 and the inverter 132).

In some examples, a number of the AC switchgear component(s) and/or a number of the DC switchgear component(s) can be the same as the number of the set(s) of secondary windings. However, the current disclosure is not limited as such, and the AC switchgear component(s) can include any number (e.g., 10, 20, 30, 40, etc.) of AC switchgear components. The DC switchgear component(s) can include any number (e.g., 10, 20, 30, 40, etc.) of DC switchgear component(s). In some examples, any number of the AC switchgear component(s) can be integrated together, and/or combined as, a corresponding integrated AC switchgear component. Any techniques discussed throughout this disclosure can be performed utilizing the integrated AC switching component(s) in a similar way as for the AC switchgear component 118. Any number of DC switchgear component(s) in the DC switchgear components can be integrated together, and/or combined as, a corresponding integrated DC switchgear component. Any techniques discussed throughout this disclosure can be performed utilizing the integrated DC switching component(s) in a similar way as for the DC switchgear component 120.

In some examples, an active power filter 138 can be coupled to the transformer 114 in parallel. The active power filter 138 can be controlled based on the power wirelessly transferred to the receive coil 140. By controlling the active power filter 138, power output by the transmission coil 134 can be controlled. The active power filter 138 can control power output by the transmission coil 134, by controlling power output by the transformer 114.

In some examples, the active power filter 138 can be controlled to control power at a first control level based on a number of vehicle charger(s) (e.g., a number of vehicle charger(s) that include the vehicle charger 108). The active power filter 138 can be controlled to control power output by the transformer 114 at a first control level based on a first number of vehicle charger(s) (e.g., a first number of vehicle charger(s) that include the vehicle charger 108). The active power filter 138 can be controlled to control power output by the transformer 114 at a second control level based on a second number of vehicle charger(s) (e.g., a second number of vehicle charger(s) that include the vehicle charger 108. The first control level can be greater than or equal to the second control level based on the second number of vehicle chargers being greater than or equal to the first number of vehicle chargers. By controlling, via the active power filter 138, power output by the transformer 114 at the first control level, individual phase shifts between corresponding currents output by corresponding secondary windings in corresponding sets of secondary windings can be controlled (e.g., the phase shift can be controlled to be 22.5 degrees, 27.5 degrees, etc.).

By way of example, the active power filter 138 can be controlled to control the phase shift between the currents output by the corresponding secondary windings in the set of secondary windings 124 (e.g., the phase shift can be controlled by the active power filter 138 to be any level notwithstanding power being output to any number of vehicle charger(s)). The phase shift(s) of currents of the secondary winding pairs can be controlled to be consistent as a number of vehicle charger(s) changes in real time. The active power filter 138 can be controlled (e.g., dynamically controlled) to adjust power levels (e.g., to be substantially constant) for corresponding currents output by corresponding secondary windings in any number of secondary winding pairs, at a time (e.g., a first time) at which one or more winding pairs previously not receiving power begin to receive power, or a time (e.g., a second time) at which one or more secondary winding pairs previously receiving power cease to receive power.

Individual ones (e.g., the inverter 132) of the inverter(s) can transfer power (e.g., power of the fourth power type) to corresponding transmission coil(s) (e.g., the transmission coil 134). Individual ones (e.g., the transmission coil 134) of the transmission coil(s) can wirelessly transmit power received from the corresponding inverter(s) (e.g., the inverter 132) to corresponding vehicle system(s) (e.g., the vehicle system 110).

Individual ones (e.g., the vehicle system 110) of the vehicle system(s) can include one or more corresponding receive coils, one or more corresponding rectifiers (e.g., "high frequency (HF) rectifier(s)"), one or more corresponding storage devices (e.g., "HF battery packs"), and one or more corresponding propulsion systems. In some examples, a level (e.g., a first level) of frequency (e.g., a high frequency) may be 20 hertz (Hz) to 200 kHz, which may be higher than another level (e.g., a second level) of frequency associated with one or more other components (e.g., the transformer 114). By way of example, the vehicle system 110 can include a receive coil 140, a rectifier (e.g., an "HF rectifier") 142, one or more storage devices (e.g., a battery pack) (e.g., an "HF battery pack,") 144, and a propulsion system 146.

Although the first level (e.g., a "high frequency level") of frequency in the electric power charger 104 may be 20 Hz to 200 kHz, as discussed above in this disclosure, it is not limited as such. Any level of frequency (e.g., 20 Hz, 100 Hz, 1 kHz, 10 kHz, 100 kHz, 200 kHz, etc.) may be utilized as the first level of frequency.

Individual ones (e.g., the receive coil 140) of the receive coil(s) can receive wireless power transmitted by the corresponding transmission coils (e.g., the transmission coil 134). In some examples, power received by each of the receive coil(s) can receive power of the fourth power type (e.g., 100 kW AC power at the third voltage level (e.g., 240 V-410 V)). In those of examples, all of the set(s) of secondary windings (e.g., 30 sets of secondary windings) of the transformer 114 can provide power of the fourth power type (e.g., 100 kW AC power at the third voltage level (e.g., 240 V-410 V)) to all of the receive coil(s) (e.g., 30 receive coils), respectively. The transformer 114 can operate, at least at 95% efficiency and with a total harmonic distortion at a level of 5%, to provide power of the fourth power type to all of the receive coil(s), respectively. In some a number of the receive coil(s) can be the same as the number of the set(s) of secondary windings. However, the current disclosure is not limited as such, and the receive coil(s) can include any number (e.g., 10, 20, 30, 40, etc.) of receive coils.

Individual ones (e.g., the receive coil 140) of the receive coil(s) can transfer received power (e.g., power of the fourth power type that is received from the corresponding inverter(s)) to the corresponding rectifier(s) (e.g., the rectifier 142). In some examples, power can be transferred from individual ones of the receive coil(s) to the corresponding rectifier(s), via one or more corresponding wires and one or more corresponding capacitors. By way of example, power can be transferred from the receive coil 140 to the rectifier 142, via one or more wires and one or more capacitors.

Individual ones (e.g., the rectifier 142) of the rectifier(s) can convert received power (e.g., power of the fourth power type that is received from the corresponding the receive coil(s)) to power of a fifth power type (e.g., 100 kW DC power at a fifth voltage level (e.g., 240 V-410 V DC)). In some examples, power of the fifth power type can be substantially similar to power of the third power type (e.g., 100 kW DC power at the third voltage level (e.g., 240 V-410 V DC)). In those examples, a difference between a level of power of the fifth power type and a level of power of the third power type can be less than a threshold difference. Individual ones (e.g., the rectifier 142) of the rectifier(s) can transfer converted power (e.g., power of the fifth power type to corresponding storage device(s) (e.g., one or more storage devices of the storage device(s) 144) and/or to corresponding propulsion system(s) (e.g., the propulsion system 146).

In some examples, individual ones (e.g., the vehicle system 110) of the vehicle system(s) may be associated with (e.g., included in) corresponding vehicles, as discussed below with reference to FIG. 5. In some examples, individual ones (e.g., the propulsion system 146) of the propulsion system(s) can include two electrical propulsion units, a motor/inverter, etc.

In some examples, a number of the vehicle charger(s) can be the same as the number of set(s) of secondary windings. However, the current disclosure is not limited as such, and the vehicle charger(s) can include any number (e.g., 10, 20, 30, 40, etc.) of vehicle chargers.

Although only one transformer is included in the power converter components group 106 as discussed above in the current disclosure, it is not limited as such. Any number of transformers can be included in the power converter components group 106 and implemented in a similar way as the transformer 114.

Although only one thermal system, one thermal system power source, and one house keeping power source are included in the power converter components group 106 as discussed above in the current disclosure, it is not limited as such. Any number of thermal systems, thermal system power sources, and housekeeping power sources can be included in the power converter components group 106 and implemented in a similar way as the thermal system 126, the first power source 128, and the second power source 130, respectively.

Although various terms associated with power management, such as "providing," "transmitting," or "transferring" power, are utilized through the current disclosure, it is not limited as such. Accordingly, such terms are provided for clarity and simplicity of explanation and can be interpreted as being interchangeable. Although various terms associated with portions of the electric power charger and/or the vehicle system, such as components including "switchgear," "transformer," "rectifier," "inverter," etc., are utilized through the current disclosure, it is not limited as such. Accordingly, such terms are provided for clarity and simplicity of explanation and the electric power charger and/or the vehicle system, as well as any portions of the electric power charger and/or the vehicle system, can be interpreted as being circuits (e.g., electrical circuits) configure to perform any functions of the corresponding charger, system, and components.

Figure 2:
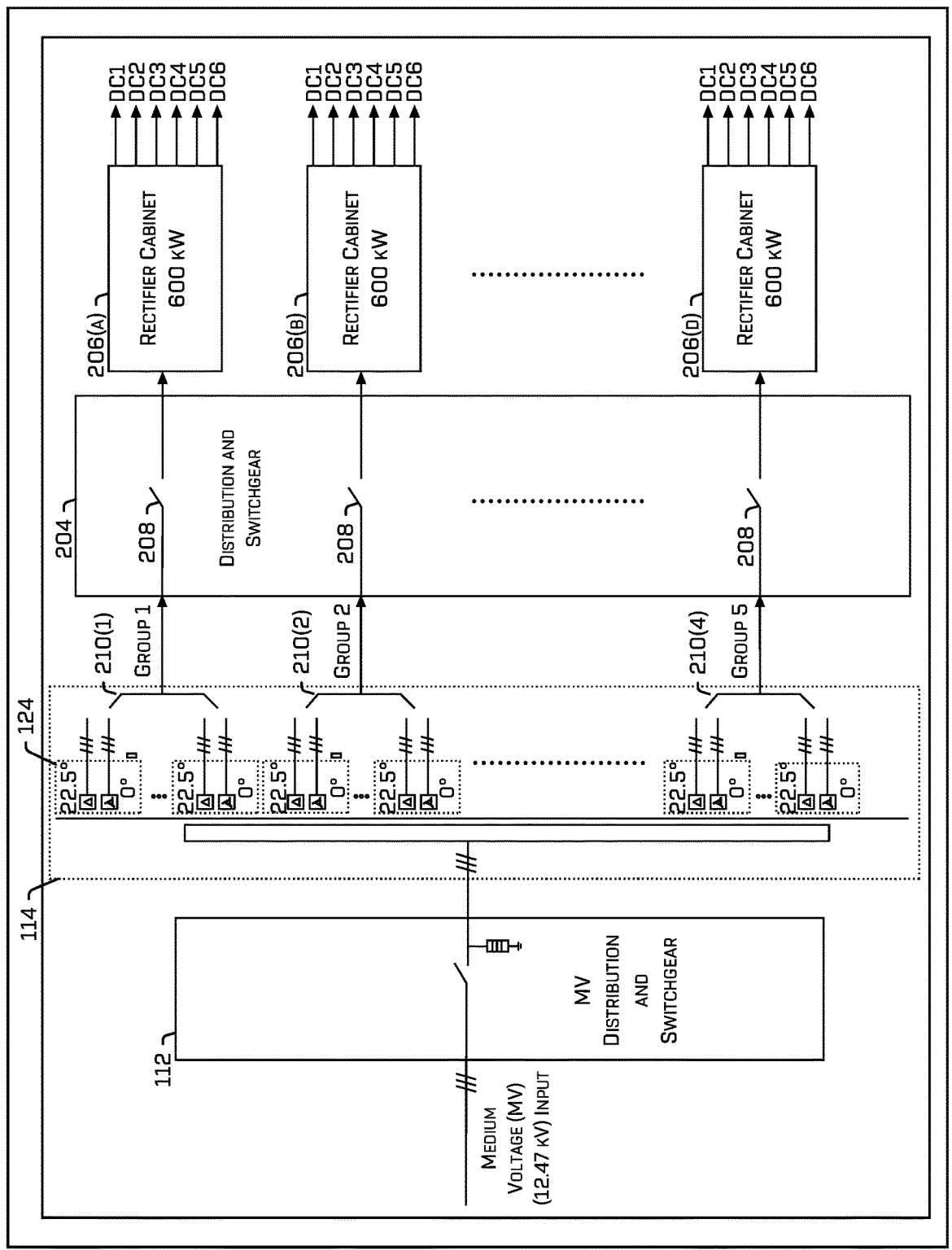
FIG. 2 is a circuit diagram of an example power converter.

FIG. 2 is a circuit diagram of an example electric power charger 200. The electric power charger 200 may be utilized to implement the electric power charger 104, as discussed above with reference to FIG. 1. In some examples, the electric power charger 200 can include components in the electric power charger 104, as discussed above with reference to FIG. 1, such as the AC switchgear 112, the transformer 114, the primary winding 122, and the set(s) of secondary windings 124. In those examples, the electric power charger 200 can include distribution and switchgear 204, and one or more charging power cabinets 206(1)-206(5) (referred to herein collectively as charging power cabinet(s) 206). Although five charging power cabinet(s) 206 are illustrated, the current disclosure is not limited as such, and can include any number of charging power cabinets.

In some examples, the distribution and switchgear (e.g., "low voltage (LV) distribution and switchgear") 204 can be implemented to include a combination of the AC switchgear 118 and the DC switchgear 120. The distribution and switchgear 204 can include one or more protection components 208, represented as a switch, for simplicity. However, the current disclosure is not limited as such, and any of the one or more of the component(s) 208 can be a fuse, a circuit breaker, a switch, etc. Any of the protection component(s) 208 can be utilized to implemented any of the protection component(s) of the AC switchgear 118 and/or the DC switchgear 120.

The transformer 114 can include one or more groups 210(1)-210(4) (referred to herein collectively as group(s) of secondary winding sets 210). Individual ones of the group(s) can include one or more of the set(s) of secondary windings. In some examples, a number of the set(s) of secondary windings in individual ones (e.g., the group of secondary winding sets 210(1)) of the group(s) of secondary winding sets 210 can be associated with the same as a number of one or more power outputs of the corresponding charging cabinet (e.g., the charging power cabinet 206(1)). By way of example, the group of secondary winding sets 210(1) can include 6 sets of secondary windings; and the charging power cabinet 206(1) can include 6 corresponding power outputs DC1-DC6. Individual ones (e.g., the charging power cabinet 206(1)) of the charging power cabinets 206 can output 600 kW of power, as a combination of the 6 100 kW power outputs.

In some examples, individual ones of the power output(s) (e.g., power outputs DC1-DC6) of individual ones (e.g., the charging power cabinet 206(1)) of the charging power cabinet(s) 206 can be connected to corresponding vehicle chargers (e.g., the vehicle charger 108) of the plurality of vehicle chargers. By way of example, the power output DC1 of the charging power cabinet 206(1) can be included in the vehicle charger 108 (e.g., the power output DC1 can be connected to the inverter 132 in the vehicle charger 108).

Although a single wire and a single switch are illustrated as being connected between a group of secondary winding sets (e.g., the group of secondary winding sets 210(a)) and a charging power cabinet (e.g., the charging power cabinet 206(1), the current disclosure is not limited as such. Any number of wires and any number of switches can be connected between individual groups of the group(s) of secondary winding sets 210 and the corresponding charging power cabinets (e.g., the charging power cabinet 206(1)).

In some examples, the transformer 114 can include an active power filter (e.g., the active power filter 138, as discussed above with reference to FIG. 1) coupled in parallel with the groups of secondary winding sets 210. The active power filter 138 can be coupled, via one or more of the protection component(s), 208 to a Y winding (e.g., a Y secondary winding) of the transformer 114. The active power filter 138 can receive power that is transmitted by the primary winding 122 and received by the Y winding (e.g., the Y winding that is coupled to the active power filter 138). Although the active power filter 138 can be coupled to the Y winding as discussed above in this disclosure, it is not limited as such. Any type of winding (e.g., a delta winding, a single winding, etc.) may be utilized for the winding by which the active power filter 138 receives power.

Figure 3:
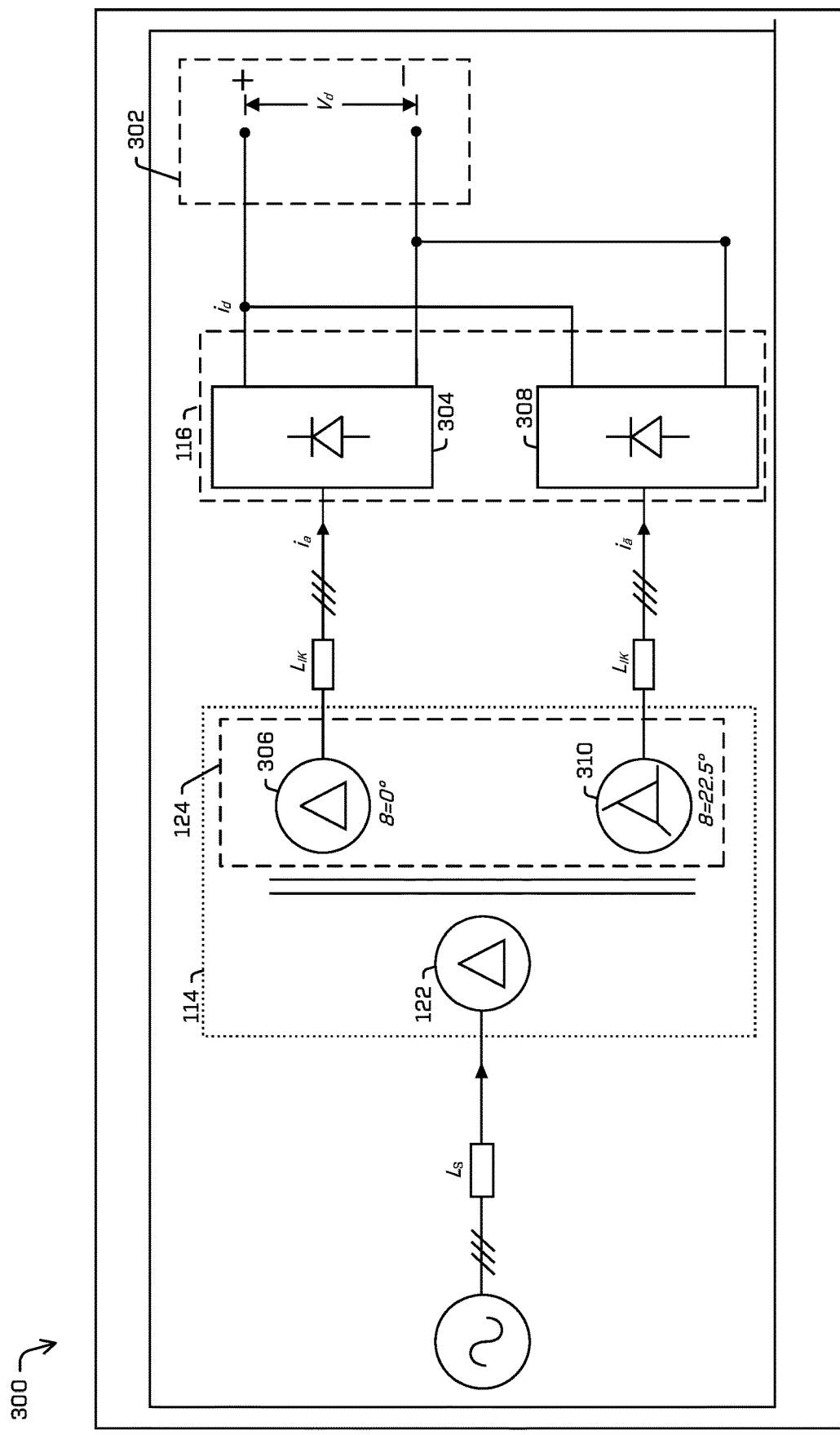
FIG. 3 is a circuit diagram of a portion of an example electric power charger.

FIG. 3 is a circuit diagram of an example portion 300 of an electric power charger. The example portion 300 of the electric power charger may be utilized to implement a portion of the electric power charger 104, as discussed above with reference to FIG. 1. In some examples, the example portion 300 of the electric power charger can include components in the electric power charger 104 (e.g., the power converter components group 106 in the electric power charger 104), as discussed above with reference to FIG. 1, such as the transformer 114, the rectifier 116, the primary winding 122, and the set of secondary windings 124. In those examples, the example portion 300 of the electric power charger can include components in the electric power charger 104, as discussed above with reference to FIG. 1, such as the distribution and switchgear 204. Although a single primary winding and a single set of secondary windings are illustrated, the current disclosure is not limited as such, and can include any number of primary windings and any number of sets of secondary windings, with individual ones of the primary winding(s) being implemented in a similar way as the primary winding 122, and with individual ones of the set(s) of secondary windings being implemented in a similar way as the set of secondary windings 124.

In some examples, the rectifier 116 can include a rectifier circuit (e.g., a first rectifier circuit) 304 connected to a winding (e.g., a first winding) 306 of the set of secondary windings 124, and a rectifier circuit (e.g., a second rectifier circuit) 308 connected to a winding (e.g., a secondary winding) 310 of the set of secondary windings 124. In those examples, a set of outputs 302 can be connected, in parallel, to the rectifier circuit 304 and the rectifier circuit 308. Any of one or more of the protective component(s) of the AC switchgear 118 can be connected between the rectifier circuit 304 and the winding 306 (e.g., connected in series with the rectifier circuit 304 and the winding 306, via any corresponding wires between the rectifier circuit 304 and the winding 306), and/or between the rectifier circuit 308 and the winding 310 (e.g., connected in series with the rectifier circuit 308 and the winding 310, via any corresponding wires between the rectifier circuit 308 and the winding 310).

Any of one or more of the protective component(s) of the DC switchgear 120 can be connected between the rectifier circuit 304 and the outputs 302 (e.g., connected in series with the rectifier circuit 304 and the outputs 302, via any corresponding wires between the rectifier circuit 304 and the outputs 302), and/or between the rectifier circuit 308 and the outputs 302 (e.g., connected in series with the rectifier circuit 308 and the outputs 302, via any corresponding wires between the rectifier circuit 308 and the outputs 302).

The rectifier 304 and the rectifier 308 can receive power from the windings 306 and 310, respectively, via corresponding inductors. The rectifier 304 and the rectifier 308 can convert power of the second power type (e.g., AC power at a second voltage level (e.g., 360 volts (V)±10% V)). The rectifier 304 and the rectifier 308 can output a DC signal (also referred to herein as "DC electrical power") of a third power type (e.g., 100 kW DC power at a third voltage level (e.g., 240 V-410 V)) to the set of outputs 302.

Figure 4:
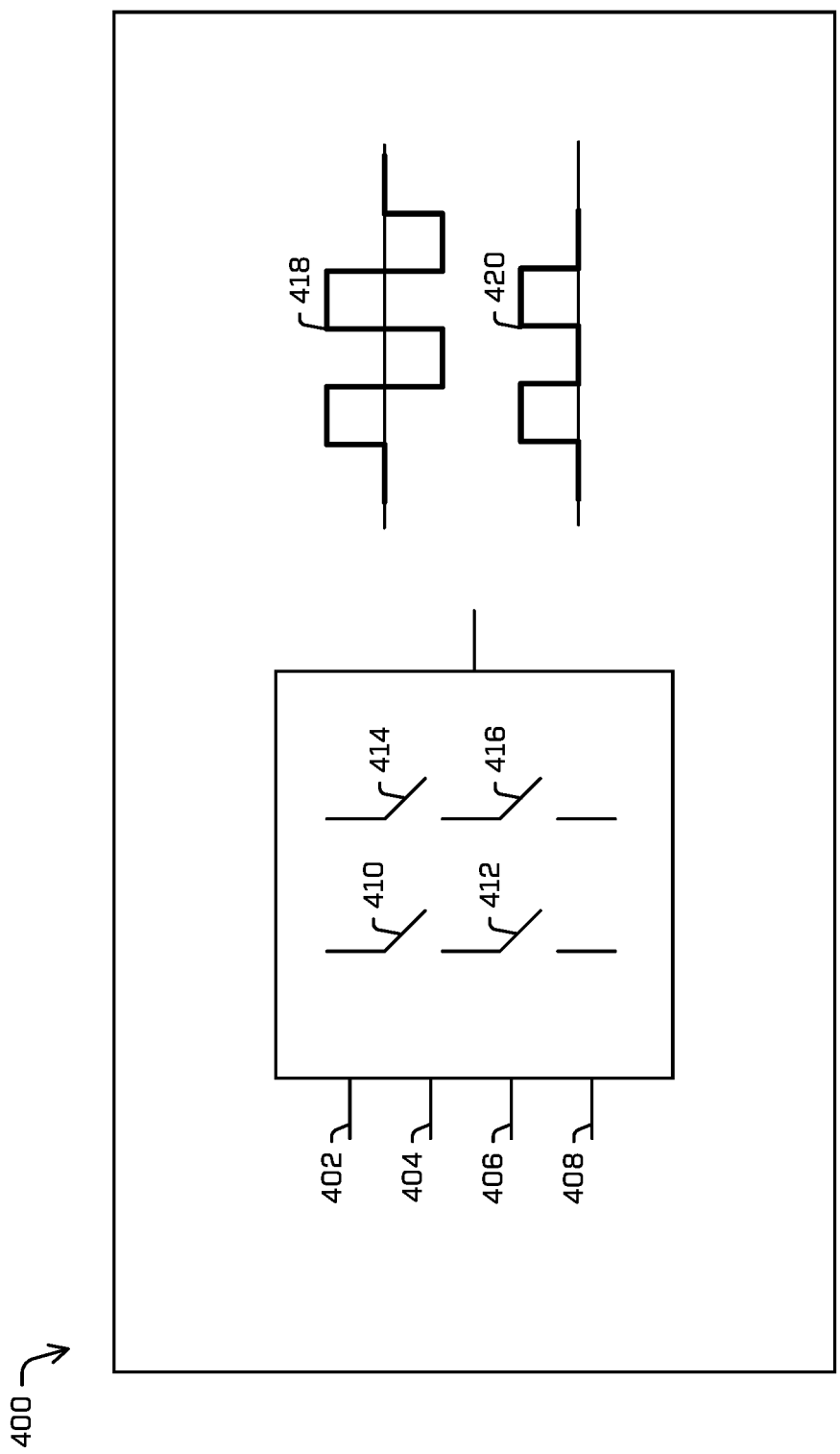
FIG. 4 is a circuit diagram of an example electric power charger controller.

FIG. 4 is a circuit diagram of an example electric power charger controller 400. The electric power charger controller 400 can be utilized to control, and/or be integrated with, one or more of any portion of the electric power charger 104 (e.g., individual ones (e.g., the power converter components group 106 of the power converter components group(s), individual ones (e.g., the vehicle charger 108) of the vehicle charger(s), any portion (e.g., the transformer 114) of the power converter components group 106, any portion (e.g., the inverter 132) of the vehicle charger 108, etc.). By way of example, the electric power charger controller 400 can be utilized to control, and/or be integrated with, the inverter 132 that transfers power from the power converter components group 106 to the transmission coil 134 of the vehicle charger 108, as discussed above with reference to FIG. 1. In some examples, any number of individual ones of the vehicle charger(s) that receive power from the power converter components group 106 can include an inverter that is controlled by, or integrated with, an electric power charger controller in a similar way as for the inverter 132 that is controlled by, or integrated with, the electric power charger controller 400.

The example electric power charger controller (also referred to herein as a "control circuit") 400 can be utilized to control the inverter 132 based on one or more power parameters (e.g., one or more parameters associated with a power level (also referred to herein as a "level of power" or an "amount of power") (one or more parameters associated with a charging level (also referred to herein as a "level of charging" or an "amount of charging")) of a storage device (e.g., the storage device(s) 144) of a vehicle (e.g., the vehicle that includes the vehicle system 110, as discussed above with reference to FIG. 1)). In some examples, the parameter(s) utilized to control the inverter 132, based on information associated with the parameter(s) (e.g., information received from the vehicle system 110), can include any type of parameter (e.g., a charge target voltage parameter, a charge target current parameter, a charge target power parameter, etc.). The example electric power charger controller 400 can include a control input (e.g., a first control input) 402, a control input (e.g., a second control input) 404, a control input (e.g., a third control input) 406, and a control input (e.g., a fourth control input) 408. The inverter 132 can include a plurality of transistors, the plurality of transistors including a switch (e.g., a transistor) (e.g., a first transistor) 410, a switch (e.g., a transistor) (e.g., a second transistor) 412, a switch (e.g., a transistor) (e.g., a third transistor) 414, and a switch (e.g., a transistor) (e.g., a fourth transistor) 416.

The example electric power charger controller 400 can receive, from the vehicle system 110, a request (also referred to as a "message") (e.g., a first current request) based on the power level of the storage device(s) 144 being less than a power threshold, and further based on the receive coil 140 of the vehicle system 110 being positioned to engage in a wireless power transfer with the transmission coil 134. The example electric power charger controller 400 can control, based on the first current request, the plurality of transistors in the example electric power charger controller 400 associated with a bipolar mode. By way of example, the example electric power charger controller 400 can control, based on individual first states of corresponding transistors in the plurality of transistors, the inverter 132 to output a first square wave signal 418 and a first duty signal. In some examples, the first square wave signal 418 can oscillate between −500 V and +500 V. The example electric power charger controller 400 can receive, from the vehicle system 110, a second current request. The second current request can be received from the vehicle system 110, based on the vehicle system 110 determining individual levels of one or more corresponding power parameters (e.g., one or more power levels, etc.) of the storage device(s) 144 are indicative of a level of power stored in the storage device(s) 144 (e.g., one or more vehicle batteries, a vehicle battery pack, etc.) meeting or exceeding a power threshold.

The example electric power charger controller 400 can control, based on the second current request, the plurality of transistors in the example electric power charger controller 400 associated with a unipolar mode. By way of example, the example electric power charger controller 400 can control, based on individual second states of corresponding transistors in the plurality of transistors, the inverter 132 to output a second square wave signal 420 and a second duty signal. In some examples, the second square wave signal 420 can oscillate between 0 V and +500 V.

Although the first message can be utilized to control an inverter (e.g., the inverter 132) in the bipolar mode and the second message can be utilized to control the inverter in the unipolar mode, as discussed above in the current disclosure, it is not limited as such. Any number of messages can be utilized to control the inverter in the bipolar mode, any number of messages can be utilized to control the inverter in the unipolar mode, and any number of messages can be utilized to control a duty cycle of the inverter in the bipolar mode or the unipolar mode. Although the inverter can be controlled in the bipolar mode, followed by the unipolar mode, as discussed above in the current disclosure, it is not limited as such. The inverter can be controlled in any combination of one or more modes (e.g., one or more bipolar modes and/or one or more unipolar modes) in any order to charge vehicle storage device(s) (e.g., the storage device(s) 144). Individual ones of the inverter(s) can be controlled to charge the corresponding vehicle storage devices independently from, or together in a same way as, one or more remaining ones of the storage device(s).

Although an inverter (e.g., the inverter 132) is controlled in the bipolar mode and the unipolar mode, respectively, as discussed above in the current disclosure, it is not limited as such. Individual ones of the inverter(s) can be controlled independently of, or together in a same way as, any of one or more remaining inverters.

Although one or more square waves signals (e.g., the first square wave signal 418 and/or the second square wave signal 420) can be provided by an inverter (e.g., the inverter 132), as discussed above in the current disclosure, it is not limited as such. In some examples, the first square wave signal 418 output by the inverter 132 in the bipolar mode can be utilized to output power from the electric power charger 104 (also referred to herein as a "power converter") at a first level of power. In those examples, the second square wave signal 420 output by the inverter 132 in the unipolar mode can be utilized to output power from the electric power charger 104 at a second level of power. In those examples, the first level of power may be higher than the second level of power. Any of one or more waves of various types can be provided by the inverter, including a sine wave, a triangle wave, a square approximation of a sine wave, etc. Individual ones of the wave(s) can be provided based on a message received by an electric power charger controller (e.g., the electric power charger controller 400) and from a vehicle system (e.g., the vehicle system 110).

Although a component (e.g., the example electric power charger controller 400) can receive one or more requests, the component that receives any of the request(s) being described as the example electric power charger controller 400 in the current disclosure is for simplicity and clarity of explanation, and it is not limited as such. Any of the techniques discussed throughout this disclosure can be implemented in a similar way for any request(s) that are described and/or interpreted as being received by an electric power charger (e.g., the electric power charger 104) and/or any components of the electric power charger 104 (e.g., the example electric power charger controller 400, the vehicle charger 108, and/or an adapter (e.g., the adapter 508, as discussed below with reference to FIG. 5B). Any of the components (e.g., the example electric power charger controller 400, the vehicle charger 108, and/or the adapter 508) can be implemented separate from, or in combination with, any of one or more of the others.

Although one or more messages (e.g., the first message and/or the second message) can be utilized to control an inverter (e.g., the inverter 132) in a power conversion mode (e.g., the bipolar mode and/or the unipolar mode, respectively), as discussed above in the current disclosure, it is not limited as such. Any of one or more messages received by an electric power charger controller (e.g., the electric power charger controller 400) can include a request for power, a request indicating a level of current (e.g., a current level utilized by the electric power charger controller 400 to control one or more characteristics (e.g., a power transfer mode characteristic (e.g., a characteristic of the power transfer mode being the bipolar mode or the unipolar mode), a duty cycle characteristic (e.g., a characteristic of the duty cycle), etc.) of the inverter such that power at the level of current is received the storage device(s) 144), a message indicating a level of current at which power is currently being received by the storage device(s) 144, a message indicating a temperature (e.g., a current storage device(s) 144 temperature) of the storage device(s) 144, a request indicating a duty cycle at which the inverter is to provide power, a message indicating a number of miles driven by the vehicle, a message indicating an amount of time the vehicle can remain charging before it has to go return to service (also referred to herein as "operation"), a message indicating a number of charge cycles and/or a number of discharge cycles previously undergone by the storage device(s) 144, etc. The message(s) can include one or more messages to request information (e.g., a state of charge (SoC), a model number, a voltage level, a condition (age, usage history, etc.) associated with the storage device(s) 144. In some examples, any of the message(s) can include any of one or more of the parameter(s) utilized to control the inverter 132, as discussed above.

In some examples, the example electric power charger controller 400 can be utilized to control the inverter 132 based on a power level of the storage device(s) 144 of the vehicle. The example electric power charger controller 400 can be utilized to control the inverter 132 as a full bridge inverter (e.g., a full H bridge inverter) for the bipolar mode, based on a request (e.g., the first request) associated with the power level of the storage device(s) 144 being less than a power threshold (e.g., a first power threshold). The example electric power charger controller 400 can be utilized to control the inverter 132 as a half bridge inverter for the unipolar mode, based on a request (e.g., the second request) associated with the power level of the storage device(s) 144 meeting or exceeding a power threshold (e.g., a second power threshold).

In some examples, the first power threshold can be implemented as a single power threshold that is the same as the second power threshold. In those examples, a duty cycle (e.g., a first duty cycle) associated with power output by the inverter 132 in the bipolar mode may be higher than another duty cycle (e.g., a second duty cycle), and the first duty cycle may be gradually reduced over time based on a charging profile to the second duty cycle. In some examples, the first duty cycle can be a 100% duty cycle (representing the relative times between on/off). However, the current disclosure is not limited as such, and the first duty cycle can be a duty cycle associated with any amount (e.g., 70%, 80%, 90%, etc.) of time "on" relative to time "off". The first duty cycle is gradually reduced over time based on a charging profile to the second duty cycle, based on the request associated with the power level of the storage device(s) 144 being less than the single power threshold. In some examples, the fourth duty cycle can be a 0% duty cycle (e.g., no power transfer). However, the current disclosure is not limited as such, and the first duty cycle can be a duty cycle associated with any amount (e.g., 10%, 20%, 30%, etc.).

The inverter 132 may switch from the bipolar mode to the unipolar mode at a time while the first duty cycle is being gradually reduced based on the charging profile to the fourth duty cycle, and further based on the request associated with the power level of the storage device(s) 144 meeting or exceeding the single power threshold. In those examples, a third duty cycle associated with power output by the inverter 132 in the unipolar mode may be higher than a fourth duty cycle, and the third duty cycle may be gradually reduced over time based on a charging profile to the fourth duty cycle. In some examples, the third duty cycle can be a duty cycle associated with 100% transfer of power. However, the current disclosure is not limited as such, and the third duty cycle can be a duty cycle associated with any amount (e.g., 70%, 80%, 90%, etc.) of transfer of power. The third duty cycle is gradually reduced over time based on a charging profile to the fourth duty cycle, based on a request (e.g., a third request) associated with the power level of the storage device(s) 144 meeting or exceeding the single power threshold. In some examples, the fourth duty cycle can be a duty cycle of 0% transfer of power. However, the current disclosure is not limited as such, and the fourth duty cycle can be a duty cycle associated with any amount (e.g., 10%, 20%, 30%, etc.) of transfer of power.

The example electric power charger controller 400 can control the inverter 132 in the bipolar mode, according to any of the techniques discussed herein, by controlling the plurality of transistors. The example electric power charger controller 400 that controls the inverter 132 to output the first square wave signal 418 can include, for a positive portion of the AC output voltage (e.g., the bipolar AC voltage output from the inverter 132) and at a first time, controlling the control input 402 to output a signal (e.g., a signal having a high logic value, e.g., a value (also referred to herein as a "level") of +5 V) to turn on the transistor 410, controlling the control input 404 to output a signal (e.g., a signal having a high logic value, e.g., a value of +5 V) to turn on the transistor 412, controlling the control input 406 to output a signal (e.g., a signal having a first logic value (e.g., a "low logic value") (e.g., a value of −5 V)) to turn off the transistor 414, and controlling the control input 408 to output a signal (e.g., a signal having the first logic value (e.g., the "low logic value" (e.g., a value of −5 V)) to turn off the transistor 416. The example electric power charger controller 400 that controls the inverter 132 to output the first square wave signal 418 can include, for a negative portion of the AC output voltage (e.g., the bipolar AC voltage output from the inverter 132) and at a second time, controlling the control input 406 to output a signal (e.g., a signal having a second logic value (e.g., a "high logic value") (e.g., a value of +5 V)) to turn on the transistor 414, controlling the control input 408 to output a signal (e.g., a signal having a high logic value, e.g., a value of +5 V) to turn on the transistor 416; controlling the control input 402 to output a signal (e.g., a signal having the first logic value (e.g., the "low logic value") (e.g., a value of −5 V) to turn off the transistor 410; and controlling the control input 404 to output a signal (e.g., a signal having the first logic value (e.g., the "low logic value") (e.g., a value of −5 V) to turn off the transistor 412. The controlling of the plurality of transistors at the first time and the second time can continue iteratively, to output the first square wave signal 418.

The controlling of the plurality of transistors to output the first square wave signal 418 can include determining times (e.g., the first time and the second time) to control the duty cycle. A positive portion of the AC output voltage (e.g., the bipolar AC voltage output from the inverter 132) that is a percentage amount of a period of the AC output voltage can be controlled based on the times (e.g., the first time and the second time). The percentage amount can be the duty cycle (e.g., the first duty cycle or the second duty cycle). The percentage amount for the duty cycle (e.g., the first duty cycle) associated with power output by the inverter 132 in the bipolar mode may be higher than the percentage amount for another duty cycle (e.g., the second duty cycle), based on the duty cycle (e.g., the first duty cycle) associated with power output by the inverter 132 in the bipolar mode being higher than the other duty cycle (e.g., the second duty cycle). An amount of time between the first time and the second time for the first duty cycle can be higher than an amount of time between the first time and the second time for the second duty cycle.

The example electric power charger controller 400 can control the inverter 132 in the unipolar mode, according to any of the techniques discussed herein, by controlling the plurality of transistors. The example electric power charger controller 400 that controls the inverter 132 to output the second square wave signal 420 can include, for a positive portion of the AC output voltage (e.g., the unipolar AC voltage output from the inverter 132) and at a third time, controlling the control input 402 to output a signal (e.g., a signal having a high logic value, e.g., a value of +5 V) to turn on the transistor 410, controlling the control input 404 to output a signal (e.g., a signal having a high logic value, e.g., a value of +5 V) to turn on the transistor 412, controlling the control input 408 to output a signal (e.g., a signal having a high logic value, e.g., a value of +5 V) to turn on the transistor 416, and controlling the control input 406 to output a signal (e.g., a signal having the first logic value (e.g., the "low logic value") (e.g., a value of −5 V)) to turn off the transistor 414. The example electric power charger controller 400 that controls the inverter 132 to output the second square wave signal 420 can include, for a zero portion of the unipolar AC output voltage (e.g., the AC voltage output from the inverter 132) and at a fourth time, controlling the control input 404 to output a signal (e.g., a signal having the second logic value (e.g., the "high logic value") (e.g., a value of +5 V) to turn on the transistor 412, controlling the control input 408 to output a signal (e.g., a signal having the second logic value (e.g., the "high logic value") (e.g., a value of +5 V) to turn on the transistor 416, controlling the control input 402 to output a signal (e.g., a signal having the first logic value (e.g., the "low logic value") (e.g., a value of −5 V) to turn off the transistor 410, and controlling the control input 406 to output a signal (e.g., a signal having the first logic value (e.g., the "low logic value") (e.g., a value of −5 V) to turn off the transistor 414. The controlling of the plurality of transistors at the third time and the fourth time can continue iteratively, to output the second square wave signal 420.

The controlling of the plurality of transistors to output the second square wave signal 420 can include determining times (e.g., the third time and the fourth time) to control the duty cycle, in a similar way as for the first square wave signal 418. The percentage amount for the duty cycle associated with power output by the inverter 132 in the unipolar mode may be higher than the percentage amount for another duty cycle, based on the duty cycle associated with power output by the inverter 132 in the bipolar mode being higher than the other duty cycle. In some examples, individual ones of the plurality of transistors can be corresponding nmos transistors (e.g., n-type metal-oxide-semiconductor field-effect transistors (MOSFETs)).

Figures 5A, 5B:
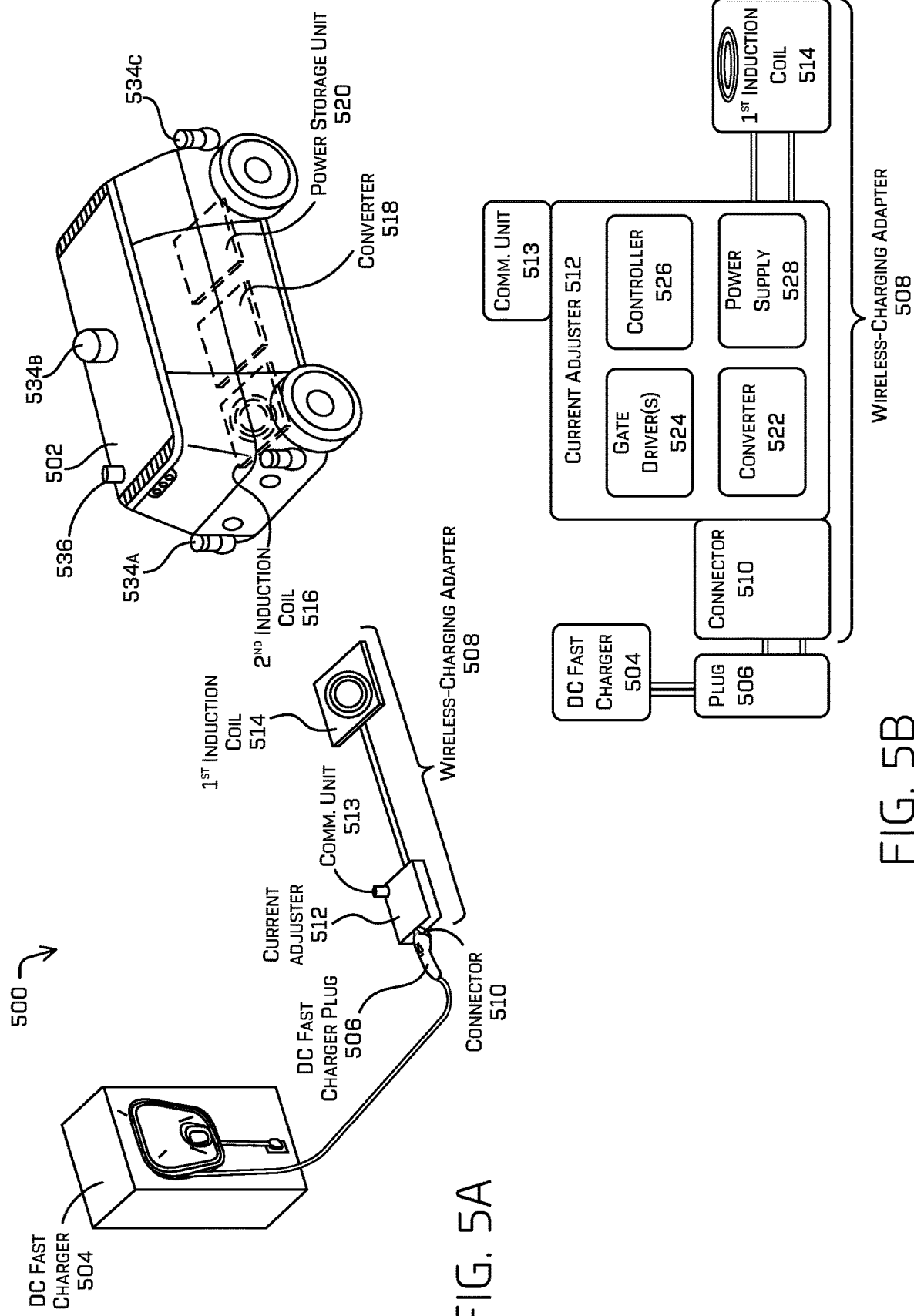
FIG. 5A is an example environment including an example vehicle with a rechargeable battery and wireless-charging adapter coupled to a direct current (DC) fast charger.
FIG. 5B is a schematic block diagram of an example wireless-charging adapter.

FIG. 5A is an example environment 500 including an example vehicle 502 with a rechargeable battery and wireless-charging adapter coupled to a direct current (DC) fast charger. The example vehicle 502 may maneuver into position during an example recharging event. The example vehicle 502 may be any configuration of vehicle, such as, for example, a van, a sport utility vehicle, a cross-over vehicle, a truck, a bus, an agricultural vehicle, and a construction vehicle. The vehicle 502 may be powered by one or more electric motors, one or more internal combustion engines, any combination thereof (e.g., by a hybrid powertrain), and/or any other suitable electric power sources. For the purpose of illustration, the example vehicle 502 is an at least partially electrically powered vehicle having two electrical propulsion units configured to provide the vehicle 502 with the ability to maneuver, each including a motor/inverter electrically coupled to one or more storage devices configured to be recharged, as explained herein. For example, the vehicle 502 may be a bidirectional vehicle having a first drive module positioned in a front end and a second drive module positioned in a rear end. As used herein, a bidirectional vehicle is one that is configured to switch between traveling in a first direction of the vehicle and a second, opposite, direction of the vehicle. In other words, there is no fixed "front" or "rear" of the vehicle 502. In other examples, the techniques described herein may be applied to vehicles other than bidirectional vehicles.

The vehicle 502 may also include sensors 534a-534c, which may include a perception sensor, including a sensor capturing data of an environment around the vehicle 502 (e.g., lidar, camera, time-of-flight, sonar, radar, etc.). In addition, the vehicle 502 can also include one or more communication units 536 that enable communication between the vehicle 502 and one or more other local or remote computing devices via one or more protocols. For example, the vehicle 502 may exchange communications with other devices in the environment 500 (e.g., the DC fast charger 504 or the adapter 508) and/or with remote devices (e.g., a remote teleoperation computing device). Communications may be exchanged via physical and/or logical interfaces. For example, the communication unit 536 may enable Wi-Fi-based communication such as via frequencies defined by the IEEE 802.11 standards, short range wireless frequencies (e.g., Bluetooth, Zigbee, etc.), cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

The environment 500 can also include a contact-based direct current (DC) fast charger 504 (e.g., charging station), including a DC fast charger plug 506. The DC fast charger plug 506 may include one of various connector types, including SAE J1772, IEC 61851-3, ChAdeMO, Chinese GB/T, and the like. In accordance with examples of the disclosure, a wireless-charging adapter 508 may be coupled to the DC fast charger (e.g., mated with the plug 506 via a contact-based coupling) to facilitate wireless charging. The adapter 508 may be plugged into the DC fast charger and remain connected between charging sessions. In other examples, the adapter 508 may be plugged in, and unplugged, between charging sessions. For instance, in some examples, the adapter 508 may be unplugged and transported with the vehicle 502 between charging sessions. At a high level, the adapter 508 includes an electrical connector 510 to mate with the plug 506; a current adjuster 512, including hardware and software for managing and facilitating adapter 508 operations; a communications unit 513; and a first induction coil 514.

Although a wireless-charging adapter (e.g., the wireless-charging adapter 508) may be coupled to a DC fast charger (e.g., the DC fast charger 504) via a plug (e.g., the plug 506) as discussed above in this disclosure, it is not limited as such. In some examples, the wireless-charging adapter may be integrated with the DC fast charger. In those examples, the plug may be omitted. In some examples, the DC fast charger 504 may be utilized to implement a portion of the power converter components group 106, as discussed above with reference to FIG. 1. However, the disclosure is not limited as such; and, any number of components from among any number of power converter components groups (e.g., components group(s) similar to the power converter components group 106) can be utilized to provide power to any number of adapters (e.g., adapter(s) similar to the adapter 508).

In some examples, the first induction coil may be utilized to implement individual ones of the transmission coil(s), as discussed above with reference to FIG. 1. In examples of the disclosure, the example vehicle 502 may be configured to use the adapter 508 for providing power to one or more storage devices coupled to the vehicle 502 (e.g., charging one or more batteries in the vehicle). For example, the vehicle 502 may include a second induction coil 516 (e.g., mounted underneath the vehicle) to wirelessly receive a charge from the first induction coil 514, a converter 518 (e.g., electric power charger) to convert the AC from the first induction coil to DC, and a power storage unit 520 to store the DC from the converter 518. In some examples, transferring power further comprises transmitting, via an AC signal, power by the first induction coil 514 with a height gap from the second induction coil 516 that is between 100 mm and 200 mm. However, the current disclosure is not limited as such, and any height gap (e.g., 50 mm, 150 mm, 250 mm, etc.) between the first induction coil 514 and the second induction coil 516 sufficient for transferring power can be utilized.

In some examples, the second induction coil 516 and the power storage unit 520 may be utilized to implement, respectively, individual ones (e.g., the receive coil 140) of the receive coil(s), and individual ones (e.g., a storage device of the storage device(s) 144), as discussed above with reference to FIG. 1. The converter 518 may include various components, such as an inverter, a rectifier, and/or a bi-directional AC to DC converter. In some examples, the second induction coil 516, the converter 518, and the power storage unit 520 may be part of the central body of the vehicle 502. In other instances, the second induction coil 516, the converter 518, and the power storage unit 520 may be part of one or more detachable drive assemblies. In alternative examples, each drive assembly may have a power storage unit, while the second induction coil 516 and the converter 518 are attached to the vehicle body and are connectable to the power storage unit 520. In other examples, the second induction coil 516, the converter 518, and the power storage unit 520 may include a module that can be connected to, and disconnected from, other vehicle components (e.g., drive assembly), such as for retrofitting and/or modularizing.

FIG. 5B is a schematic block diagram of an example wireless-charging adapter. The schematic block diagram shows the adapter 508 coupled to the DC fast charger plug 506 (via the connector 510), and additional components of the adapter 508 are depicted. In accordance with examples of the disclosure, the adapter 508 includes the current adjuster 512 with various hardware and software for controlling and performing operations of the adapter 508. In some examples, the adapter 508 may include a disconnect device (not shown in FIG. 5B), such as a contactor, which may both establish and interrupt power from the DC fast charger 504 to the adapter 508 as necessary.

In additional examples, the current adjuster 512 can include a converter 522 (e.g., full-bridge DC to AC high frequency inverter, bi-directional converter, electric power charger, etc.) for changing a DC provided by the DC fast charger 504 to an AC to be provided to the first induction coil 514. In some examples, the converter 522 may be utilized to implement individual ones (e.g., the inverter 132) of the inverters(s), as discussed above with reference to FIG. 1. In addition, the current adjuster 512 can include gate driver(s) 524 for controlling switches in the converter 522 and a controller 526, such as a microcontroller and/or control board. Among other things, the controller 526 may control operations of the current adjuster 512 (e.g., gate-driver operations, switch positions, disconnect device, etc.) and communicate with one or more other components to facilitate wireless charging.

In addition, the controller 526 may include one or more processors and one or more computer-readable storage media storing instructions executable by the one or more processors, wherein the instructions, when executed, cause the controller 526 to perform operations. By way of example and not limitation, the processor(s) may include one or more central processing units (CPUs), graphics processing units (GPUs), field-programmable gate array (FPGA), complex programmable logic device (CPLD), integrated circuit(s), etc., or any other device or portion of a device that processes electronic data to transform that electronic data into other electronic data that can be stored in registers and/or memory. In addition, the computer-readable storage media may include both volatile and nonvolatile media and/or removable and non-removable media implemented in any method or technology for storage of information such as computer-readable instructions, data structures, program modules, and/or other data types. For example, the memory may store computer-readable instructions. Computer-storage media may include, but is not limited to, non-transitory media such as RAM, ROM, EEPROM, flash memory or other memory technology, or any other medium which may be used to store the desired information and which may be accessed by controller 526.

In some examples, a portion of the controller 526 may be utilized to implement the example electric power charger controller 400 and/or any other of one or more controller utilized to control the electric power charger 104. However, the current disclosure is not limited as such one or more other controllers may be utilized, alternatively or in addition to the controller 526, to implement the electric power charger controller 400, and/or one or more other controllers of the electric power charger 104, in a similar way as for the controller 526. In some examples, one or more controllers (e.g., the controller 526, the electric power charger controller 400, and/or the other controller(s)) can be utilized for any type of controlling of the electric power charger 104. In those examples, any of the controllers can be utilized, individually or in combination, to control any components (e.g., the active power filter 138, the inverter 132, etc.) and/or functions of the electric power charger 104.

Furthermore, the current adjuster 512 can include a power supply 528 (e.g., power supply unit) to provide power to components of the current adjuster 512, such as to the gate driver(s) 524 and the controller 526. The power supply 528 may include various types of power supply units (e.g., isolated power supply unit), and in some instances, the power supply 528 may convert power received from DC fast charger 504 to power (e.g., "low voltage DC power") (e.g., 120 V DC power) to be utilized by one or more storage devices. The power supply 528 may also (or alternatively) include one or more other sources of DC, such as the storage device(s) (e.g., batteries, solar-powered sources, etc). In some examples of the disclosure, the power supply 528 may include a housekeeping power supply. That is, in some instances, the adapter 508 may be in a power state (e.g., a "low-power state") (e.g., de-energized), such as when no second induction coil is present, and as such, the housekeeping power supply may provide or receive a level of power (e.g., a "low level of power") to maintain basic or startup functionality. The current adjuster 512 may include other components. For example, the current adjuster 512 may include an input filter cap for filtering high frequency voltage ripple (e.g., from the DC provided by the DC fast charger). In addition, the current adjuster 512 may include a compensation capacitor or primary capacitor (e.g., to facilitate series-series compensation), which may help to align component resonance.

In some examples, the power supply 528 may be utilized to implement individual ones (e.g., the rectifier 116) of the rectifier(s), as discussed above with reference to FIG. 1. However, the current disclosure is not limited as such, and individual ones (e.g., the rectifier 116) of the rectifier(s) can be implemented, alternatively or additionally, by other corresponding rectifier(s) in other components (e.g., other corresponding rectifiers in a power converter components group).

In additional examples, the wireless-charging adapter 508 may include one or more communication units 513 that enable, via a wireless communication link or channel, communication between the adapter 508 and one or more other local or remote computing devices via one or more protocols. In some examples, the communication units 513 may be utilized to transmit and/or receive any messages (e.g., requests, current requests, etc.) between the example electric power charger controller 400 and the vehicle system 110, as discussed above with reference to FIG. 1. For example, the adapter 508 may exchange communications with other devices in the environment 500 (e.g., the DC fast charger 504 or the vehicle 502; or the vehicle system 110, as discussed above with reference to FIG. 1) and/or with remote devices (e.g., a remote teleoperation computing device). Communications may be exchanged via physical and/or logical interfaces. For example, the communication unit 513 may enable Wi-Fi-based communication such as via frequencies defined by the IEEE 802.11 standards, short range wireless frequencies (e.g., Bluetooth, Zigbee, etc.), cellular communication (e.g., 2G, 3G, 4G, 4G LTE, 5G, etc.), millimeter wave communications, satellite communication, dedicated short range communications (DSRC), or any suitable wired or wireless communications protocol that enables the respective computing device to interface with the other computing device(s). As such, in some examples, the adapter 508 (e.g., using the communication unit 513) may communicate directly with a vehicle (e.g., using the communication unit 536) or may communicate indirectly with the vehicle through a backend server (e.g., both the adapter 508 and the vehicle 502 communicate via cellular communication with the backend server, which facilitates message exchanges).

In one or more examples of the disclosure, the adapter 508 is connected to the DC fast charger 504 by mating the electrical connector 510 to the plug 506. A DC that is provided by the DC fast charger 504 is received by the adapter 508. In some examples, the DC from the DC fast charger may be a high voltage DC in a range of about 200 V to about 1 kV. The converter 522, based on inputs (e.g., control signals) from the gate driver(s) 524, changes the DC to an AC, and the AC is provided to the first induction coil 514 (and also possibly to the power supply 528). The first induction coil 514 may, as a result of the AC flow from the converter 522, provide wireless charging (e.g., non-contact power) to a second induction coil (e.g., via a Series Series-Resonant Inductive Power Transfer (SS-RIPT) link). In additional examples, the adapter 508 may monitor the provision of power to the second induction coil and may terminate the DC signal from the DC fast charger 504 based on various events. For example, the adapter 508 may detect a change in impedance (e.g., when the vehicle 502 having a second induction coil moves away from the adapter 508), and based on the change, terminate the DC (e.g., via the disconnect device or via signaling). In other examples, the adapter 508 may receive a signal from the vehicle 502 declining non-contact power (e.g., declining additional power such as when the power storage unit is sufficiently charged above a threshold).

As described above, prior to the vehicle being proximate adapter 508, the adapter 508 may include a power state (e.g., a "low-power state") (e.g., "low power" or no power). That is, before the vehicle is in position to wirelessly charge, even though the adapter 508 may be connected to the DC fast charger 504 (via the connection between the plug 506 and the connector 510), the DC fast charger 504 may not provide the DC to the adapter 508, such that the first induction coil 514 is not receiving any AC (e.g., from the current adjuster 512). As such, aspects of this disclosure describe subject matter for determining that the vehicle is proximate the DC fast charger 504 and/or proximate the adapter 508 and/or for determining the second induction coil 516 is proximate the first induction coil. In addition, some aspects may, based on the determining, request DC from the DC fast charger 504 or otherwise trigger a transfer of DC from the DC fast charger to the adapter 508.

Figure 6:
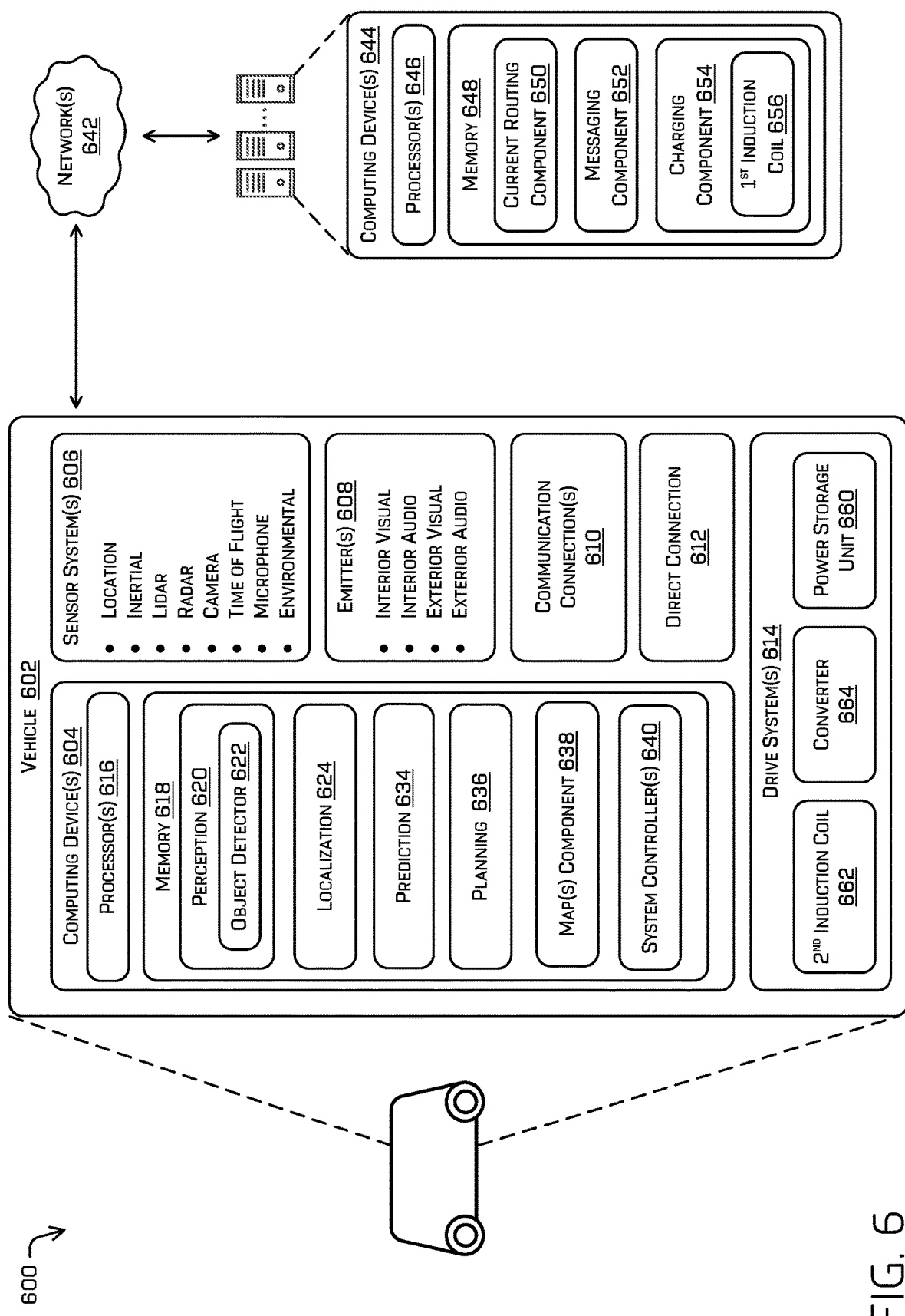
FIG. 6 depicts a block diagram of an example system for implementing the techniques described herein.

FIG. 6 depicts a block diagram of an example system 600 for implementing the techniques described herein. In at least one example, the system 600 can include a vehicle 602. In the illustrated example system 600, the vehicle 602 is an autonomous vehicle; however, the vehicle 602 can be any other type of vehicle. The vehicle 602 may be the vehicle including the vehicle system 110 depicted in FIG. 1 and may be configured to recharge a battery (e.g., power storage unit 660) using a wireless-charging adapter (e.g., the adapter 508, as discussed above with reference to FIG. 5).

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 602 can include one or more computing device(s) 604, one or more sensor system(s) 606, one or more emitter(s) 608, one or more communication connection(s) 610 (also referred to as communication devices and/or modems), at least one direct connection 612 (e.g., for physically coupling with the vehicle 602 to exchange data and/or to provide power), and one or more drive system(s) 614. The one or more sensor system(s) 606 can be configured to capture sensor data associated with an environment.

The one or more sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 606 can include multiple instances of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The one or more sensor system(s) 606 can provide input to the computing device 604.

The vehicle 602 can also include one or more emitter(s) 608 for emitting light and/or sound. The one or more emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include one or more communication connection(s) 610 that enable communication between the vehicle 602 and one or more other local or remote computing device(s) (e.g., wireless-charging adapter, DC fast charger, a remote teleoperation computing device, etc.) or remote services. For instance, the one or more communication connection(s) 610 can facilitate communication with other local computing device(s) on the vehicle 602 and/or the one or more drive system(s) 614. Also, the one or more communication connection(s) 610 can allow the vehicle 602 to communicate with other nearby computing device(s) (e.g., other nearby vehicles, traffic signals, etc.).

The one or more communications connection(s) 610 can include physical and/or logical interfaces for connecting the computing device 604 to another computing device or one or more external networks 642 (e.g., the Internet). For example, the one or more communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 4G, etc.), satellite communication, dedicated short-range communications (DSRC), or any suitable wired or wireless communications protocol that enables the respective computing device to interface with the other computing device(s).

In at least one example, the vehicle 602 can include one or more drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery (e.g., power storage unit 660), a second induction coil 662 for wirelessly charging the high voltage battery, a motor to propel the vehicle, a converter 664 to bi-directionally convert between direct current and alternating current, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

The computing device 604 can include one or more processor(s) 616 and memory 618 communicatively coupled with the one or more processor(s) 616. In the illustrated example, the memory 618 of the computing device 604 stores a perception component 620, a localization component 624, a prediction component 634, a planning component 636, a maps component 638, and one or more system controller(s) 640. Though depicted as residing in the memory 618 for illustrative purposes, it is contemplated that the perception component 620, the localization component 624, the prediction component 634, the planning component 636, the maps component 638, and the one or more system controller(s) 640 can additionally, or alternatively, be accessible to the computing device 604 (e.g., stored in a different component of vehicle 602) and/or be accessible to the vehicle 602 (e.g., stored remotely).

The perception component 620 can include functionality to perform object detection, segmentation, and/or classification. In some examples, the perception component 620 and/or the object detector 622 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional and/or alternative examples, the perception component 620 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 620 can include functionality to store perception data generated by the perception component 620. In some instances, the perception component 620 can determine a track corresponding to an object that has been classified as an object type. For purposes of illustration only, the perception component 620, using sensor system(s) 606 can capture one or more images of an environment, which may be used to determine information about an environment.

The stored perception data can, in some examples, include fused perception data captured by the vehicle. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 622 can detect (among other things) semantic objects (e.g., a charging system (e.g., a wireless-charging adapter (e.g., the wireless-charging adapter 508, as discussed above with respect to FIGS. 5A and 5B), in a charging system that includes the DC fast charger 504) represented by sensor data. In some examples, the object detector 622 can identify the charging system such semantic objects and can determine a two-dimensional or a three-dimensional bounding box associated with the charging system. The object detector 622 can determine additional information such as a location, orientation, pose, and/or size (e.g., length, width, height, etc.) associated with the charging system. The object detector 622 can send data to other components of the system 600 for localization and/or determining calibration information, as discussed herein. The localization and/or calibration information can be utilized by the vehicle 602 to position the vehicle 602 relative to the charging system for optimal charging.

The localization component 624 can include functionality to receive data from the sensor system(s) 606 and/or other components to determine a position of the vehicle 602. For example, the localization component 624 can include and/or request/receive a three-dimensional map of an environment and can continuously determine a location of the autonomous vehicle within the map. In some instances, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 624 can provide data to various components of the vehicle 602 to determine an initial position of an autonomous vehicle for generating a trajectory or for initial calibration.

The prediction component 634 can generate one or more probability maps representing prediction probabilities of possible locations of one or more objects in an environment. For example, the prediction component 634 can generate one or more probability maps for vehicles, pedestrians, animals, and the like within a threshold distance from the vehicle 602. In some instances, the prediction component 634 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 636 can determine a path for the vehicle 602 to follow to traverse through an environment. For example, the planning component 636 can determine various routes and paths and various levels of detail. In some instances, the planning component 636 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 636 can generate an instruction for guiding the autonomous vehicle along at least a portion of the route from the first location to the second location. In at least one example, the planning component 636 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 636 can alternatively, or additionally, use data from the perception component 620 and/or the prediction component 634 to determine a path for the vehicle 602 to follow to traverse through an environment. For example, the planning component 636 can receive data from the perception component 620 and/or the prediction component 634 regarding objects associated with an environment. Using this data, the planning component 636 can determine a route to travel from a first location (e.g., a current location) to a second location (e.g., a target location) to avoid objects in an environment. In at least some examples, such a planning component 636 may determine there is no such collision free path and, in turn, provide a path which brings vehicle 602 to a safe stop avoiding all collisions and/or otherwise mitigating damage.

The memory 618 can further include one or more maps 638 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps from the map(s) component 638 can include at least one map (e.g., images and/or a mesh). In some examples, the vehicle 602 can be controlled based at least in part on the map(s) component 638. That is, the map(s) component 638 can be used in connection with the perception component 620 (and sub-components), the localization component 624 (and sub-components), the prediction component 634, and/or the planning component 636 to determine a location of the vehicle 602, identify objects in an environment, generate prediction probabilit(ies) associated with objects and/or the vehicle 602, and/or generate routes and/or trajectories to navigate within an environment.

In at least one example, the computing device 604 can include one or more system controller(s) 640, which can be configured to control steering, propulsion, braking, safety, emitters, communication, and other systems of the vehicle 602. These system controller(s) 640 can communicate with and/or control corresponding systems of the drive system(s) 614 and/or other components of the vehicle 602, which may be configured to operate in accordance with a path provided from the planning component 636.

The vehicle 602 can connect to computing device(s) 644 via network 642 and can include one or more processor(s) 646 and memory 648 communicatively coupled with the one or more processor(s) 646. In at least one instance, the one or more processor(s) 646 can be similar to the processor(s) 616 and the memory 648 can be similar to the memory 618. In at least one example, the computing device(s) 644 may include a wireless-charging adapter. In the illustrated example, the memory 648 of the computing device(s) 644 stores a current routing component 650, a messaging component 652, and/or a charging component 654. In the illustrated example, the charging component 654 can include a first induction coil 656. In at least one instance, the current routing component 650 may be utilized for controlling power transfer between individual ones (e.g., the vehicle charger 108) of the corresponding vehicle charger(s) and the electric power charger 104, as discussed above with reference to FIG. 1. In some examples, the current routing component 650 may be utilized, along with the example electric power charger controller 400, to control functions of the power storage unit 660, the second induction coil 662, and the converter 664 for transferring power, in a similar way as discussed above for the drive system 614 and/or the communication connection(s) 610. The current routing component 650 and the example electric power charger controller 400 may exchange communications for controlling the transfer of power. In some examples, the power storage unit 660, the converter 664, and the second induction coil 662 may be utilized to implement the storage device(s) 144, the rectifier 142, and the receive coil 140, respectively, as discussed above with respect to FIG. 1.

In at least some other examples, the messaging component 652 may perform operations for transmitting messages to and/or receiving messages from internal adapter components (e.g., coil, controller, etc.) and/or external components (e.g., DC fast charger(s), vehicle(s), electricity-usage billing systems, etc.). For example, the messaging component 652 may perform operations for exchanging messages among adapter components (e.g., confirming connection to a DC fast charger plug, confirming wireless connection to a vehicle and/or to an onboard coil for charging a vehicle battery, etc.). In other examples, the messaging component 652 may exchange messages with a DC fast charger, messages with a vehicle (e.g., determining vehicle proximity, determining battery charge level, etc.), and/or messages with an onboard induction coil of a vehicle (e.g., determining proximity, alignment, etc.).

In at least one instance, the charging component 654 may be utilized for controlling charging of individual ones (e.g., the vehicle system 110) of the corresponding vehicle system (s), as discussed above with reference to FIG. 1. The charging component 654 may control the first induction coil 656, which may be utilized to implement the transmission coil 134. In some examples, the charging component 654 may be utilized to implement the adapter 508. In other examples, the charging component 654 may be utilized, alternatively or in addition to, the adapter 508 to charge individual ones (e.g., the vehicle system 110) of the corresponding vehicle system(s).

The processor(s) 616 of the computing device 604 and the processor(s) 646 of the computing device(s) 644 can be any suitable processor capable of executing instructions to process data and perform operations as described herein. By way of example and not limitation, the processor(s) 616 and 646 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 618 computing device 604 and the memory 648 of the computing device(s) 644 are examples of non-transitory computer-readable media. The memory 618 and 648 can store an operating system and one or more software applications, instructions, programs, and/or data to implement the methods described herein and the functions attributed to the various systems. In various implementations, the memory 618 and 648 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 618 and 648 can be implemented as a neural network. In some examples a machine learned (ML) model could be trained for object detection (e.g., image data used to detect a vehicle, a DC fast charger, or a wireless-charging adapter) or trajectory planning for parking in position to align coils. In some examples, the ML model can be utilized to determine whether to operate the inverter 132 in a bipolar mode or a unipolar mode, as discussed above in FIG. 1, and a duty cycle control for the duty cycle of power output by the inverter 132 for optimal control (e.g., control of wireless power transfer by the transmission coil 134/storage device life (e.g., a life of the storage device(s) 144), etc.

As described herein, an exemplary neural network is a biologically inspired algorithm which passes input data through a series of connected layers to produce an output.

Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 7:
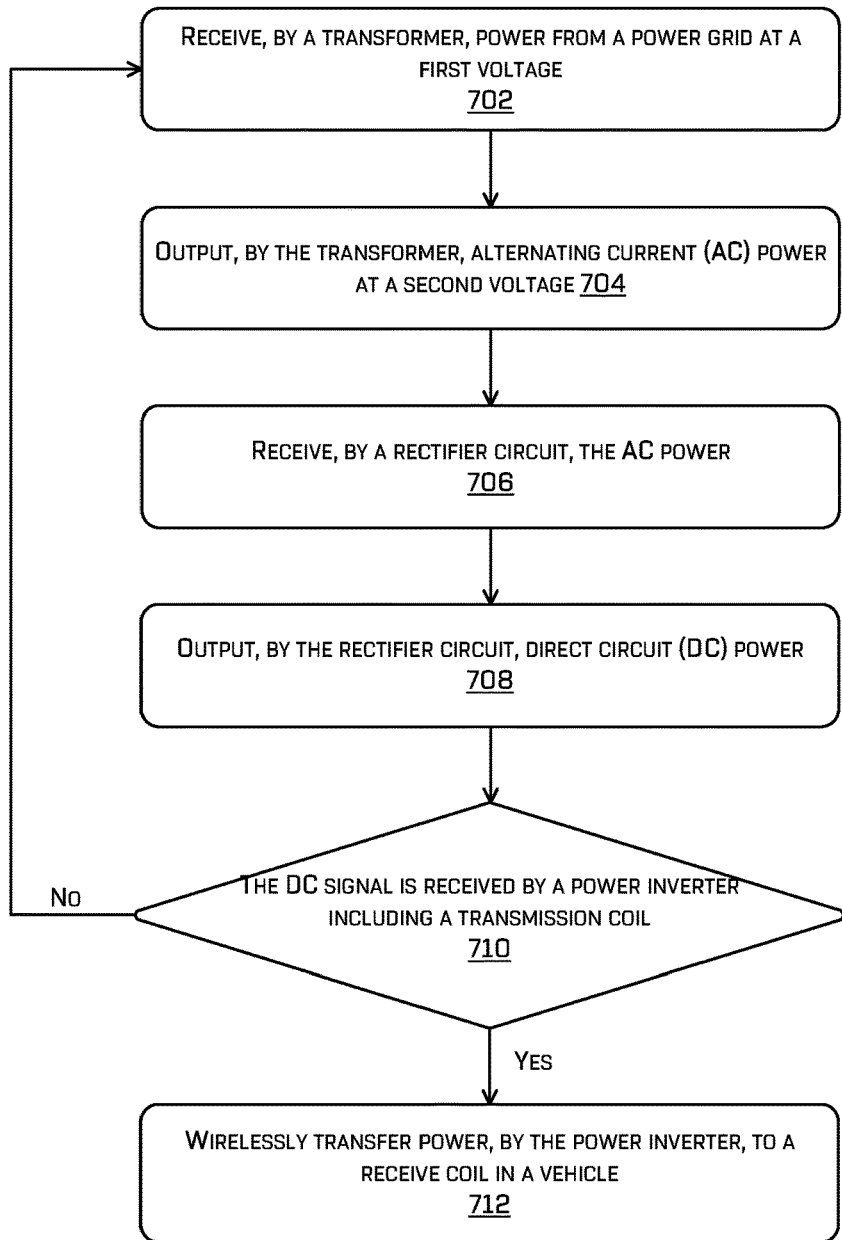
FIG. 7 depicts an example process for using an electric power charger.

FIG. 7 depicts an example process 700 for using an electric power charger. For example, some or all of the process 700 can be performed by the system 600, as described herein.

At operation 702, the example process 700 can include receiving, by a transformer (e.g., the transformer 114), power from a power grid. The transformer 114 can convert, via the primary winding 122 and the set of secondary windings 124, power that is received from the power grid.

At operation 704, the example process 700 can include outputting, by the transformer 114, alternating current (AC) power at a second voltage. The transformer 114 can output the AC power at the second voltage to the AC switchgear 118.

At operation 706, the example process 700 can include receiving, by a rectifier circuit (e.g., the rectifier circuit 116) coupled to the transformer 114, the AC power at the second voltage. The rectifier circuit 116 can be coupled to the transformer 114, via the AC switchgear 118. The rectifier circuit 116 can receive the AC power at the second voltage from the transformer 114, via the AC switchgear 118.

At operation 708, the example process 700 can include outputting, via the rectifier circuit 116, direct circuit (DC) power. The rectifier circuit 116 can output the DC power to the DC switchgear 120.

At operation 710, the example process 700 can include determining whether the DC power is received by a power inverter (e.g., the power inverter 132) including a transmission coil (e.g., the transmission coil 134). The example process 700 can proceed to operation 702, based on determining the DC power is not received by the power inverter 132. The example process 700 can proceed to operation 712, based on determining the DC power is received by the power inverter 132.

At operation 712, the example process 700 can include wirelessly transferring, by the power inverter 132, power to a receive coil (e.g., the receive coil 140) in a vehicle. The power inverter 132 can wirelessly transfer power the to receive coil 140, based on power that is received by the power inverter 132, via the DC switchgear 120.

Figure 8:
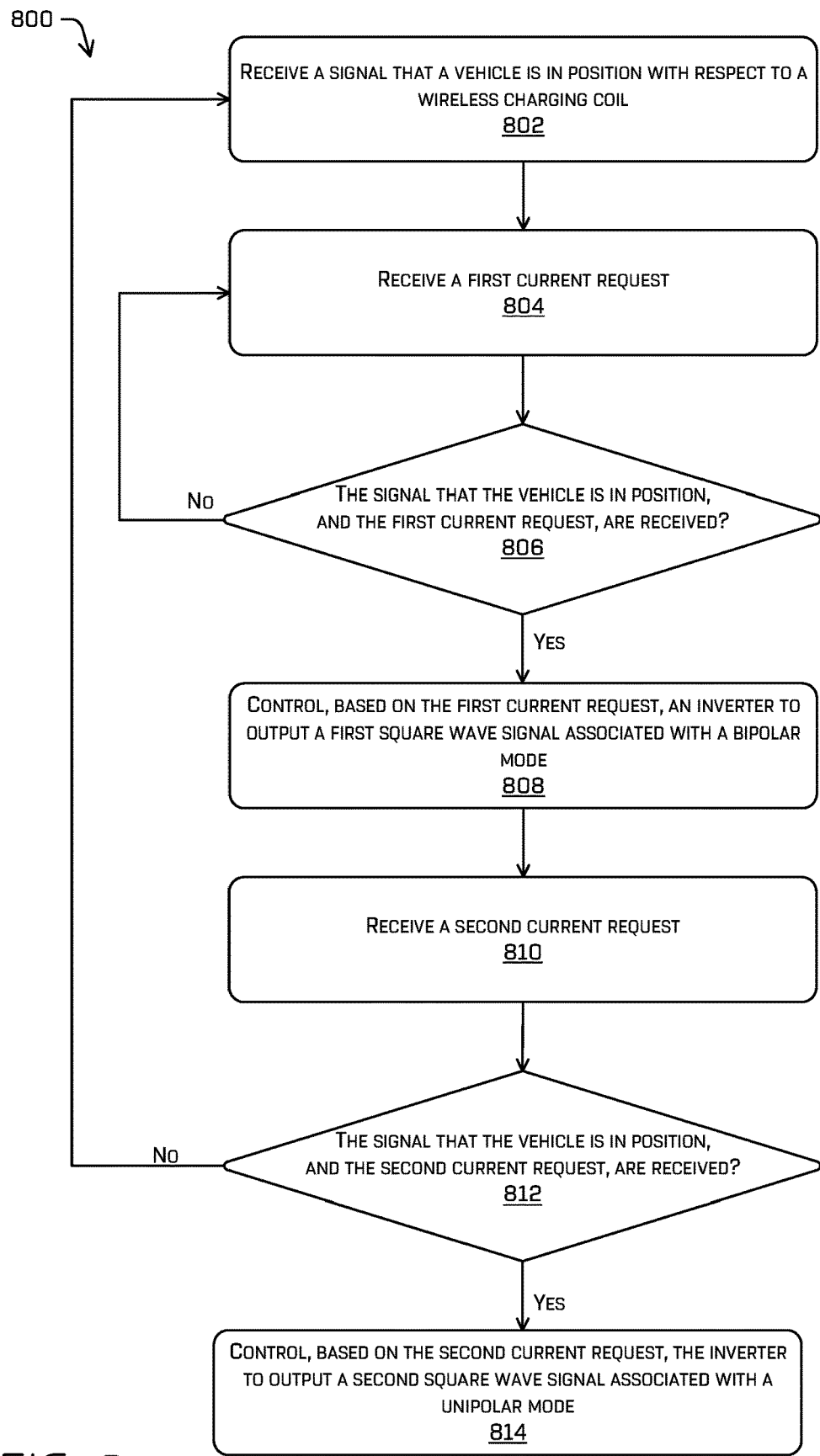
FIG. 8 depicts an example process for using an electric power charger controller.

FIG. 8 depicts an example process 800 for using an electric power charger controller. For example, some or all of the process 800 can be performed by the system 600, as described herein.

At operation 802, the example process 800 can include receiving a signal that a vehicle is in position with respect to a wireless charging coil (e.g., the transmission coil 134). In some examples, the signal (e.g., the control input (e.g., the control signal)) can be received, by the example electric power charger controller 400, as a message from the vehicle system 110, as discussed above with reference to FIG. 5.

At operation 804, the example process 800 can include receiving a first current request. The first current request can be received by the electric power charger 104 (e.g., the example electric power charger controller 400) and from the vehicle system 110.

At operation 806, the example process 800 can include determining whether the signal that the vehicle is in position, and the first current request, are received? The example process 800 can proceed to operation 802, based on determining that the signal that the vehicle is in position and/or the first current request have not received. The example process 800 can proceed to operation 808, based on determining that the signal that the vehicle is in position and the first current request have been received.

At operation 808, the example process 800 can include controlling, based on the first current request, the inverter 132 to output a first square wave signal (e.g., the first square wave signal 418) associated with a bipolar mode. The first square wave signal 418 that is output can be associated with a duty signal. The duty cycle is gradually reduced over time based on a charging profile.

At operation 810, the example process 800 can include receiving a second current request. The second current request can be received by the electric power charger 104 (e.g., the example electric power charger controller 400) and from the vehicle system 110.

At operation 812, the example process 800 can include determining whether the signal that the vehicle is in position, and the second current request, are received. The example process 800 can proceed to operation 802, based on determining that the signal that the vehicle is in position, and/or the second current request, have not received. The example process 800 can proceed to operation 808, based on determining that the signal that the vehicle is in position, and the second current request, have been received At operation 810, the example process 800 can include controlling, based on the second current request, the inverter to output a second square wave signal (e.g., the second square wave signal 420) associated with a unipolar mode. The second square wave signal 420 that is output can be associated with a duty signal. The duty cycle can be gradually reduced over time based on the charging profile. The charging profile utilized to control the duty cycle for the second square wave signal 420 can be the same as, or different than, the charging profile utilized to control the duty cycle for any other signal (e.g., the second square wave signal 420).

EXAMPLE CLAUSES

A: A system comprising: a transformer configured to receive power from a power grid at a first voltage and to output alternating current (AC) power at a second voltage; a rectifier circuit directly coupled to the transformer, the rectifier circuit configured to receive the AC power and to output direct circuit (DC) power; and a power inverter including a transmission coil configured to receive the DC power and wirelessly transfer power to a receive coil in a vehicle, wherein a phase shift between a first current output by a first winding in a pair of windings that outputs the AC power at the second voltage and a second current output by a second winding in the pair of windings is less than or equal to 27.5 degrees.

B: The system of any of paragraphs A-A, further comprising an active power filter in parallel with the transformer, the active power filter being controlled based at least in part on an amount of the power wirelessly transferred by the transmission coil.

C: The system of paragraph A, wherein the phase shift is 22.5 degrees.

D: The system of any of paragraphs A-C, wherein a level of harmonic distortion associated with an input of a charging circuit that includes the transformer and the rectifier circuit is less than 5%.

E: The system of any of paragraphs A-D, wherein: AC electrical power is received, as the power at the first voltage and by the transformer, via a first AC protection circuit; the transformer is configured to output the AC power at the second voltage to the rectifier circuit via a second AC protection circuit; and the DC power is output to the power inverter via a DC protection circuit.

F: A method comprising: receiving, by a transformer, power from a power grid at a first voltage; outputting, by the transformer, alternating current (AC) power at a second voltage; receiving, by a rectifier circuit directly coupled to the transformer, the AC power; outputting, by the rectifier circuit, direct circuit (DC) power; receiving, by a power inverter, the DC power; and transferring, by a transmission coil associated with the power inverter, power to a receive coil in a vehicle.

G: The method of paragraph F, wherein transferring power further comprises transmitting AC power at a third voltage by the transmission coil with a height gap from the receive coil that is between 100 mm and 200 mm.

H: The method of paragraph F or G, wherein a phase shift between a first current output by a first winding in a pair of windings that outputs the AC power at the second voltage and a second current output by a second winding in the pair of windings is less than or equal to 22.5 degrees.

I: The method of any of paragraphs F-H, wherein a level of harmonic distortion associated with an input of a charging circuit that includes the transformer and the rectifier circuit is less than 5%.

J: The method of any of paragraphs F-I, wherein: receiving the power further comprises receiving AC power at the first voltage by the transformer, via a first AC protection circuit; outputting the AC power further comprises outputting, by the transformer, the AC power at the second voltage to the rectifier circuit via a second AC protection circuit; and outputting the DC power further comprises outputting the DC power to the power inverter via a DC protection circuit.

K: The method of any of paragraphs F-J, wherein a level of harmonic distortion associated with a charging circuit that includes the transformer and the rectifier circuit is less than 5%.

L: The method of any of paragraphs F-K, wherein the first voltage is 12.47 kilovolts (kV) and the second voltage is between 350 volts (V) and 370 V.

M: The method of any of paragraphs F-L, wherein transformer is a delta-delta transformer with one primary winding and at least 30 secondary winding pairs.

N: The method of any of paragraphs F-M, wherein the AC power at the second voltage is output from a pair of delta windings in the transformer.

O: The method of any of paragraphs F-N, wherein receiving the power further comprises performing power factor correction (PFC) associated with transforming of the power into the AC power at the second voltage.

P: A system comprising: a transformer configured to receive power from a power grid at a first voltage and to output alternating current (AC) electrical power at a second voltage; a rectifier circuit coupled to the transformer, the rectifier circuit configured to receive the AC electrical power and to output direct circuit (DC) electrical power; and a power inverter including a transmission coil configured to receive the DC electrical power and wirelessly transfer power to a receive coil in a vehicle.

Q: The system of paragraph P, wherein a phase shift between a first current output by a first winding in a pair of windings that outputs the AC electrical power at the second voltage and a second current output by a second winding in the pair of windings is less than or equal to 22.5 degrees.

R: The system of paragraph P or Q, wherein a charging circuit including the transformer and the rectifier circuit does not include an active power factor correction stage between the transformer and a vehicle charger.

S: The system of any of paragraphs P-R, wherein: the transformer is further configured to output AC electrical power for charging a plurality of loads; and a number of the plurality of loads is at least 30.

T: The system of any of paragraphs P-S, wherein: AC electrical power is output by the power inverter; the AC electrical power output by the power inverter in a first mode is a bipolar AC electrical signal output at −500 volts (V) or +500 V; and the AC electrical power output by the power inverter in a second mode is a unipolar AC electrical signal at 0 V or +500 V.

U: A system comprising: one or more processors; and one or more computer-readable media storing instructions executable by the one or more processors, wherein the instructions, when executed, cause the system to perform operations comprising: receiving a signal that a vehicle is in position with respect to a wireless charging coil; receiving a first current request; controlling, based on the first current request, a plurality of transistors in a control circuit associated with a bipolar mode; controlling, based on individual first states of corresponding transistors in the plurality of transistors, an inverter to output a first square wave signal and a first duty signal, the first square wave signal being utilized to transmit power at a first power level from a power converter; receiving a second current request; controlling, based on the second current request, the plurality of transistors in the control circuit associated with a unipolar mode; and controlling, based on individual second states of corresponding transistors in the plurality of transistors, the inverter to output a second square wave signal and a second duty signal.

V: The system of paragraph U, wherein: controlling the inverter with the bipolar mode includes controlling the inverter to output the first square wave signal between −500 volts (V) and +500 V to a transmission coil utilized to charge the vehicle; and controlling the inverter with the unipolar mode includes controlling the inverter to output the second square wave signal between 0 and +500 V to the transmission coil.

W: The system of paragraph U or V, wherein the second square wave signal is utilized to transmit power at a second power level from the power converter, and the first level of power is higher than the second level of power.

X: The system of any of paragraphs U-W, wherein the plurality of transistors include a first transistor, a second transistor, a third transistor, and a fourth transistor, and wherein controlling the inverter to output the first square wave signal further comprises: controlling, at a first time, the first transistor to turn on, the second transistor to turn on, the third transistor to turn off, and the fourth transistor to turn off; controlling, at a second time, the third transistor to turn on, the fourth transistor to turn on, the first transistor to turn off, and the second transistor to turn off; and controlling the inverter to output the second square wave signal further comprises: controlling, at a third time, the first transistor to turn on, the second transistor to turn on, the third transistor to turn off, and the fourth transistor to turn on; and controlling, at a fourth time, the first transistor to turn off, the second transistor to turn on, the third transistor to turn off, and the fourth transistor to turn on.

Y: The system of any of paragraphs U-X, wherein the power converter including the inverter is controlled with at least 93% efficiency.

Z: A method comprising: receiving a signal that a vehicle is in position with respect to a wireless charging coil; receiving a first current request; controlling, based on the first current request, an inverter to output a first square wave signal associated with a bipolar mode and a first duty signal; receiving a second current request; and controlling, based on the second current request, the inverter to output a second square wave signal associated with a unipolar mode and a second duty signal.

AA: The method of paragraph Z, wherein: controlling the inverter with the bipolar mode includes controlling the inverter to output the first square wave signal between −500 volts (V) and +500 V to a transmission coil utilized to charge the vehicle; and controlling the inverter with the unipolar mode includes controlling the inverter to output the second square wave signal between 0 and +500 V to the transmission coil.

AB: The method of paragraph Z or AA, wherein the first square wave signal output by the inverter in the bipolar mode is utilized to output power from a power converter at a first level of power, the second square wave signal output by the inverter in the unipolar mode is utilized to output power from a power converter at a second level of power, and the first level of power is higher than the second level of power output.

AC: The method of any of paragraphs Z-AB, further comprising: utilizing a control circuit to control the inverter, the control circuit including a first transistor, a second transistor, a third transistor, and a fourth transistor; wherein controlling the inverter in the bipolar mode further comprises: controlling, at a first time, the first transistor to turn on, the second transistor to turn on, the third transistor to turn off, and the fourth transistor to turn off; controlling, at a second time, the third transistor to turn on, the fourth transistor to turn on, the first transistor to turn off, and the second transistor to turn off; and controlling the inverter in the unipolar mode further comprises: controlling, at a third time, the first transistor to turn on, the second transistor to turn on, the third transistor to turn off, and the fourth transistor to turn on; and controlling, at a fourth time, the first transistor to turn off, the second transistor to turn on, the third transistor to turn off, and the fourth transistor to turn on.

AD: The method of any of paragraphs Z-AC, wherein a power converter including the inverter is controlled with at least 93% efficiency.

AE: The method of any of paragraphs Z-AD, wherein the signal that the vehicle is in position is received from an autonomous vehicle.

AF: The method of any of paragraphs Z-AE, wherein the second current request is associated with individual levels of one or more corresponding power parameters indicative of a level of power stored in a vehicle battery meeting or exceeding a power threshold.

AG: The method of any of paragraphs Z-AF, wherein a first duty cycle associated with power output by the inverter in the unipolar mode is higher than a second duty cycle, and the second duty cycle is gradually reduced over time based on a charging profile to a first duty cycle.

AH: The method of any of paragraphs Z-AG, wherein a first duty cycle associated with power output by the inverter in the bipolar mode is higher than a second duty cycle, and the first duty cycle is gradually reduced over time based on a charging profile to the second duty cycle.

AI: The method of any of paragraphs Z-AH, wherein a level of harmonic distortion associated with the inverter being less than 5%.

AJ: One or more non-transitory computer-readable media storing instructions that, when executed, cause one or more processors to perform operations comprising: receiving a signal that an autonomous vehicle is in position with respect to a wireless charging coil; receiving a first current request; controlling, based on the first current request, a plurality of transistors in a control circuit associated with a bipolar mode; controlling, based on individual first states of corresponding transistors in the plurality of transistors, an inverter to output a first square wave signal and a first duty signal; receiving a second current request; controlling, based on the second current request, the plurality of transistors in the control circuit associated with a unipolar mode; and controlling, based on individual second states of corresponding transistors in the plurality of transistors, the inverter to output a second square wave signal and a second duty signal.

AK: The one or more non-transitory computer-readable media of paragraph AJ, wherein: controlling the inverter with the bipolar mode includes controlling the inverter to output the first square wave signal between −500 volts (V) and +500 V to a transmission coil utilized to charge the autonomous vehicle; and controlling the inverter with the unipolar mode includes controlling the inverter to output the second square wave signal between 0 and +500 V to the transmission coil.

AL: The one or more non-transitory computer-readable media of paragraph AJ or AK, wherein the first square wave signal output by the inverter in the bipolar mode is utilized to output power from a power converter at a first level of power, the second square wave signal output by the inverter in the unipolar mode is utilized to output power from the power converter at a second level of power, and the first level of power is higher than the second level of power.

AM: The one or more non-transitory computer-readable media of any of paragraphs AJ-AL, wherein the plurality of transistors include a first transistor, a second transistor, a third transistor, and a fourth transistor, wherein controlling the inverter to output the first square wave signal further comprises: controlling, at a first time, the first transistor to turn on, the second transistor to turn on, the third transistor to turn off, and the fourth transistor to turn off; controlling, at a second time, the third transistor to turn on, the fourth transistor to turn on, the first transistor to turn off, and the second transistor to turn off; and controlling the inverter to output the second square wave signal further comprises: controlling, at a third time, the first transistor to turn on, the second transistor to turn on, the third transistor to turn off, and the fourth transistor to turn on; and controlling, at a fourth time, the first transistor to turn off, the second transistor to turn on, the third transistor to turn off, and the fourth transistor to turn on.

AN: The one or more non-transitory computer-readable media of any of paragraphs AJ-AM, wherein a power converter including the inverter is controlled with at least 93% efficiency.

While the example clauses described above are described with respect to one particular implementation, it should be understood that, in the context of this document, the content of the example clauses can also be implemented via a method, device, system, computer-readable medium, and/or another implementation. Additionally, any of examples A-AN can be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
a transformer configured to receive power from a power grid at a first voltage and to output alternating current (AC) power at a second voltage;
a rectifier circuit directly coupled to the transformer, the rectifier circuit configured to receive the AC power and to output direct circuit (DC) power; and
a power inverter, the power inverter including a transmission coil configured to receive the DC power and wirelessly transfer power to a receive coil in a vehicle,
wherein a phase shift between a first current output by a first winding in a pair of windings that outputs the AC power at the second voltage and a second current output by a second winding in the pair of windings that outputs the AC power at the second voltage is less than or equal to 27.5 degrees.

2. The system of claim 1, further comprising an active power filter in parallel with the transformer, the active power filter being controlled based at least in part on an amount of the power wirelessly transferred by the transmission coil.

3. The system of claim 1, wherein the phase shift is 22.5 degrees.

4. The system of claim 1, wherein a level of harmonic distortion associated with an input of a charging circuit that includes the transformer and the rectifier circuit is less than 5%.

5. The system of claim 1, wherein:
AC electrical power is received, as the power at the first voltage and by the transformer, via a first AC protection circuit;
the transformer is configured to output the AC power at the second voltage to the rectifier circuit via a second AC protection circuit; and
the DC power is output to the power inverter via a DC protection circuit.

6. A method comprising:
receiving, by a transformer, power from a power grid at a first voltage;
outputting, by the transformer, alternating current (AC) power at a second voltage,
wherein a phase shift between a first current output by a first winding in a pair of windings that outputs the AC power at the second voltage and a second current output by a second winding in the pair of windings that outputs the AC power at the second voltage is less than or equal to 22.5 degrees;
receiving, by a rectifier circuit directly coupled to the transformer, the AC power;
outputting, by the rectifier circuit, direct circuit (DC) power;
receiving, by a power inverter, the DC power; and
transferring, by a transmission coil that is associated with the power inverter, power to a receive coil in a vehicle.

7. The method of claim 6, wherein transferring power further comprises transmitting AC power at a third voltage by the transmission coil with a height gap from the receive coil that is at least 50 mm.

8. The method of claim 7, wherein transferring power further comprises transmitting AC power at the third voltage by the transmission coil with the height gap from the receive coil that is between 100 mm and 200 mm.

9. The method of claim 6, wherein a level of harmonic distortion associated with an input of a charging circuit that includes the transformer and the rectifier circuit is less than 5%.

10. The method of claim 6, wherein:
receiving the power further comprises receiving AC power at the first voltage by the transformer, via a first AC protection circuit;
outputting the AC power further comprises outputting, by the transformer, the AC power at the second voltage to the rectifier circuit via a second AC protection circuit; and
outputting the DC power further comprises outputting the DC power to the power inverter via a DC protection circuit.

11. The method of claim 6, wherein a level of harmonic distortion associated with a charging circuit that includes the transformer and the rectifier circuit is less than 5%.

12. The method of claim 6, wherein the first voltage is 12.47 kilovolts (kV) and the second voltage is between 350 volts (V) and 370 V.

13. The method of claim 6, wherein transformer is a delta-delta transformer with one primary winding and at least 30 secondary winding pairs.

14. The method of claim 6, wherein the AC power at the second voltage is output from a pair of delta windings in the transformer.

15. The method of claim 6, wherein receiving the power further comprises performing power factor correction (PFC) associated with transforming of the power into the AC power at the second voltage.

16. A system comprising:
a transformer configured to receive power from a power grid at a first voltage and to output alternating current (AC) electrical power at a second voltage,
wherein a phase shift between a first current output by a first winding in a pair of windings that outputs the AC electrical power at the second voltage and a second current output by a second winding in the pair of windings that outputs the AC electrical power is less than or equal to 22.5 degrees;
a rectifier circuit coupled to the transformer, the rectifier circuit configured to receive the AC electrical power and to output direct circuit (DC) electrical power; and
a power inverter including a transmission coil that is configured to receive the DC electrical power and wirelessly transfer power to a receive coil in a vehicle.

17. The system of claim 16, wherein a charging circuit including the transformer and the rectifier circuit does not include an active power factor correction stage between the transformer and a vehicle charger.

18. The system of claim 16, wherein:
the transformer is further configured to output AC electrical power for charging a plurality of loads; and
a number of the plurality of loads is at least 30.

19. The system of claim 18, the transformer comprising a plurality of sets of secondary windings that each output power at a level of 100 kW.

20. The system of claim 16, wherein:
AC electrical power is output by the power inverter;
the AC electrical power output by the power inverter in a first mode is a bipolar AC electrical signal output at −500 volts (V) or +500 V; and
the AC electrical power output by the power inverter in a second mode is a unipolar AC electrical signal at 0V or +500 V.

* * * * *